United States Patent
Liang et al.

(10) Patent No.: US 10,145,162 B2
(45) Date of Patent: Dec. 4, 2018

(54) DAMPING DEVICE AND FURNITURE HINGE COMPRISING THE SAME

(71) Applicants: KING SLIDE WORKS CO., LTD., Kaohsiung (TW); KING SLIDE TECHNOLOGY CO., LTD., Kaohsiung (TW)

(72) Inventors: Hsiu-Chiang Liang, Kaohsiung (TW); Ken-Ching Chen, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

(*) Notice: Subject to any disclaimer, the term of this patent is extended or adjusted under 35 U.S.C. 154(b) by 129 days.

(21) Appl. No.: 15/252,183

(22) Filed: Aug. 30, 2016

(65) Prior Publication Data

US 2017/0254133 A1 Sep. 7, 2017

(30) Foreign Application Priority Data

Mar. 2, 2016 (TW) .............................. 105106451 A
May 19, 2016 (TW) .............................. 105115661 A
May 31, 2016 (TW) .............................. 105117121 A

(51) Int. Cl.
*E05F 3/10* (2006.01)
*E05D 5/06* (2006.01)
(Continued)

(52) U.S. Cl.
CPC .............. *E05F 3/108* (2013.01); *E05D 5/065* (2013.01); *E05F 3/12* (2013.01); *E05F 3/20* (2013.01);
(Continued)

(58) Field of Classification Search
CPC ..... E05F 5/02; E05F 5/10; E05F 3/108; E05F 3/12; E05F 3/20; E05F 5/006; E05D 5/065

See application file for complete search history.

(56) References Cited

U.S. PATENT DOCUMENTS 5,579,874 A 12/1996 Jeffries
5,702,091 A * 12/1997 Perrin .................. F16F 9/0245
188/280

(Continued)

FOREIGN PATENT DOCUMENTS

DE 20 2009 006 233 U1 9/2010
EP 2 546 443 A1 1/2013
(Continued)

*Primary Examiner* — Melanie Torres Williams
(74) *Attorney, Agent, or Firm* — Winston Hsu

(57) ABSTRACT

A damping device includes a housing, a cover assembly, a piston rod, a piston and an elastic member. The housing has an inner wall defining a chamber, and an opening communicated with the chamber. The chamber is filled with a damping medium. The cover assembly is arranged adjacent to the opening of the housing. The piston rod penetrates through the cover assembly. The piston is connected to the piston rod and movable relative to the housing. The piston includes an extension part and an expansion part located between the piston rod and the extension part. A width of the expansion part is greater than a width of the piston rod. The elastic member is arranged in the chamber of the housing, and configured to provide an elastic force to the piston.

26 Claims, 28 Drawing Sheets

(51) Int. Cl.
*E05F 3/12* (2006.01)
*E05F 3/20* (2006.01)
*E05F 5/00* (2017.01)
*E05F 5/02* (2006.01)

(52) U.S. Cl.
CPC ............... *E05F 5/006* (2013.01); *E05F 5/02* (2013.01); *E05Y 2201/21* (2013.01); *E05Y 2201/256* (2013.01); *E05Y 2201/264* (2013.01); *E05Y 2900/20* (2013.01)

(56) References Cited

U.S. PATENT DOCUMENTS

| | | | |
|---|---|---|---|
| 8,387,213 | B2 | 3/2013 | Brunnmayr |
| 8,505,165 | B2 | 8/2013 | Domenig |
| 8,572,810 | B2 | 11/2013 | Brunnmayr |
| 8,661,620 | B2 | 3/2014 | Brunnmayr |
| 8,857,014 | B2 | 10/2014 | Brunnmayr |
| 8,925,151 | B2 | 1/2015 | Salice |
| 9,021,656 | B2 | 5/2015 | Brunnmayr |
| 9,057,214 | B2 | 6/2015 | Salice |
| 2006/0118371 | A1* | 6/2006 | Zimmer ............ F16F 7/09 188/280 |
| 2012/0240351 | A1 | 9/2012 | Bienek |
| 2014/0352111 | A1 | 12/2014 | Ng |
| 2016/0076618 | A1* | 3/2016 | Svara ............ E05F 3/12 188/316 |

FOREIGN PATENT DOCUMENTS

| | | |
|---|---|---|
| JP | S56101439 A | 8/1981 |
| JP | H10331517 A | 12/1998 |
| JP | 2009133460 A | 6/2009 |
| JP | 2009167768 A | 7/2009 |
| JP | 2013512367 A | 4/2013 |
| WO | 2015039922 A1 | 3/2015 |

* cited by examiner

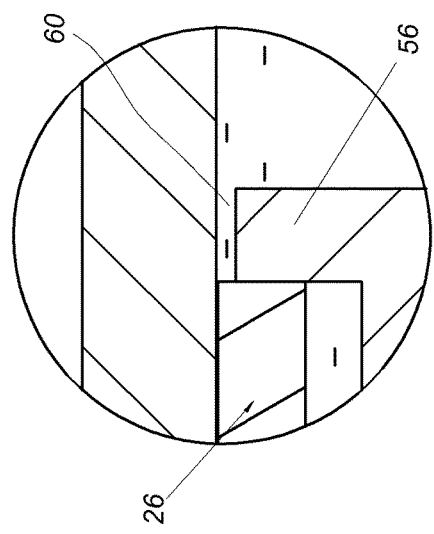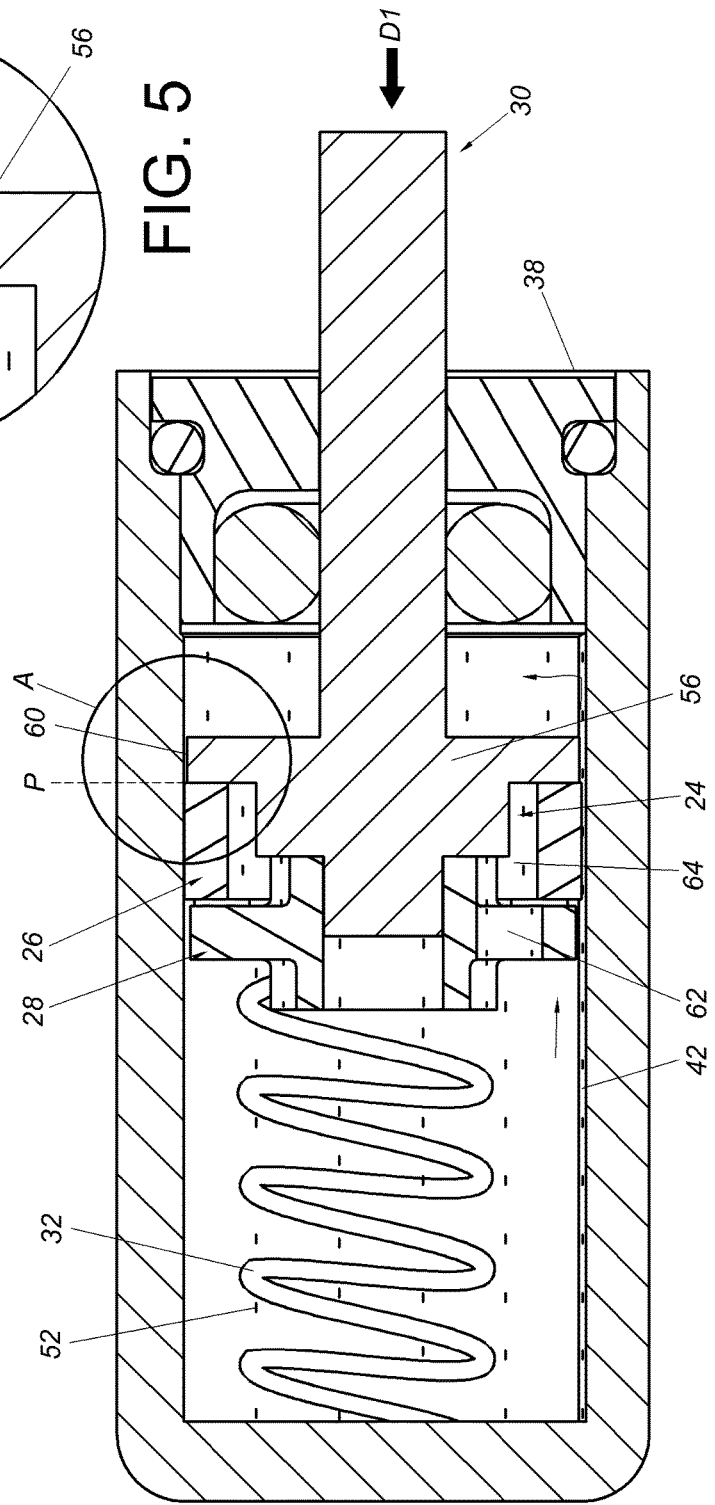

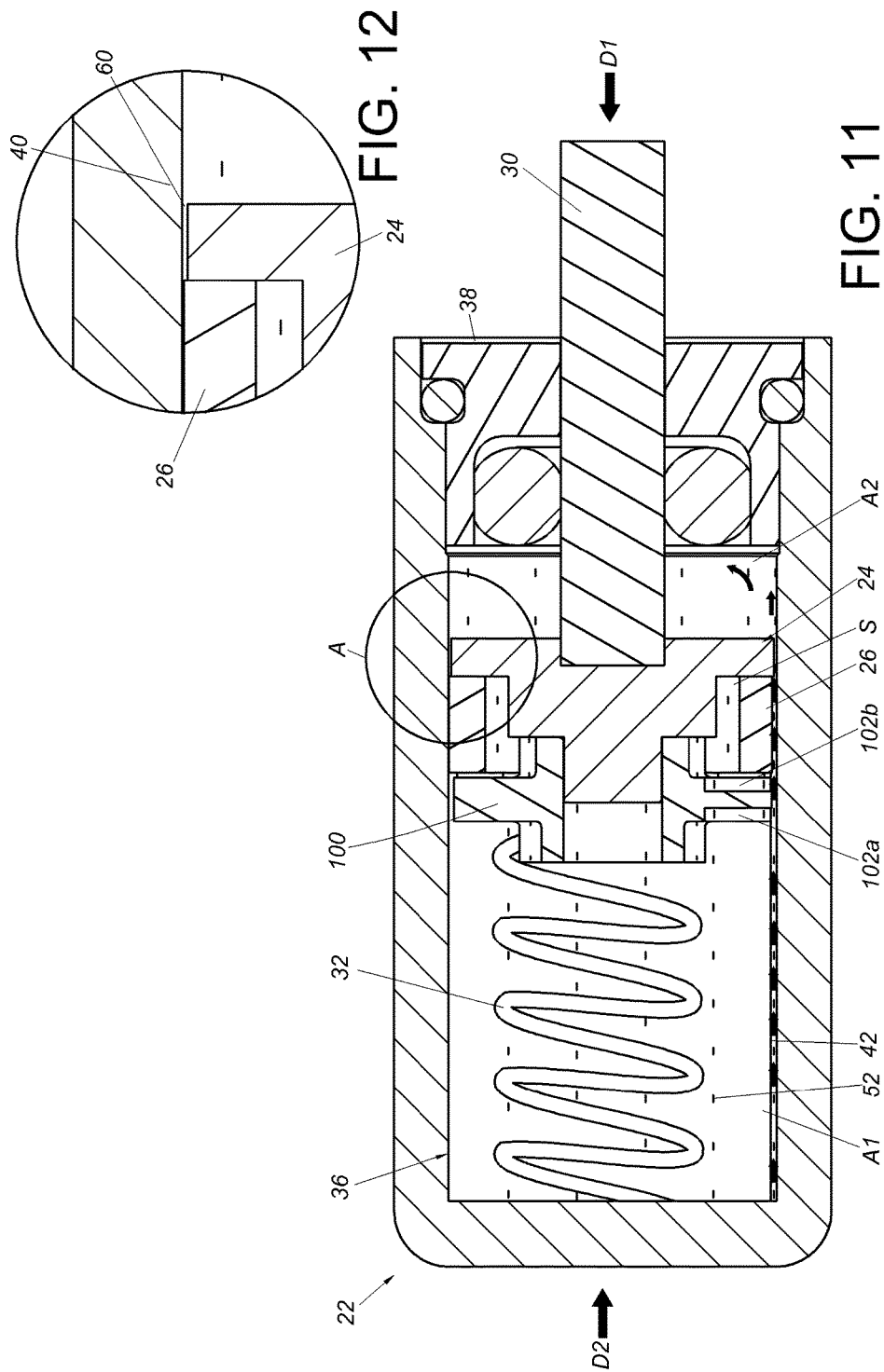

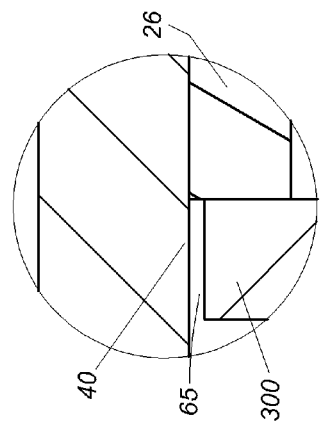
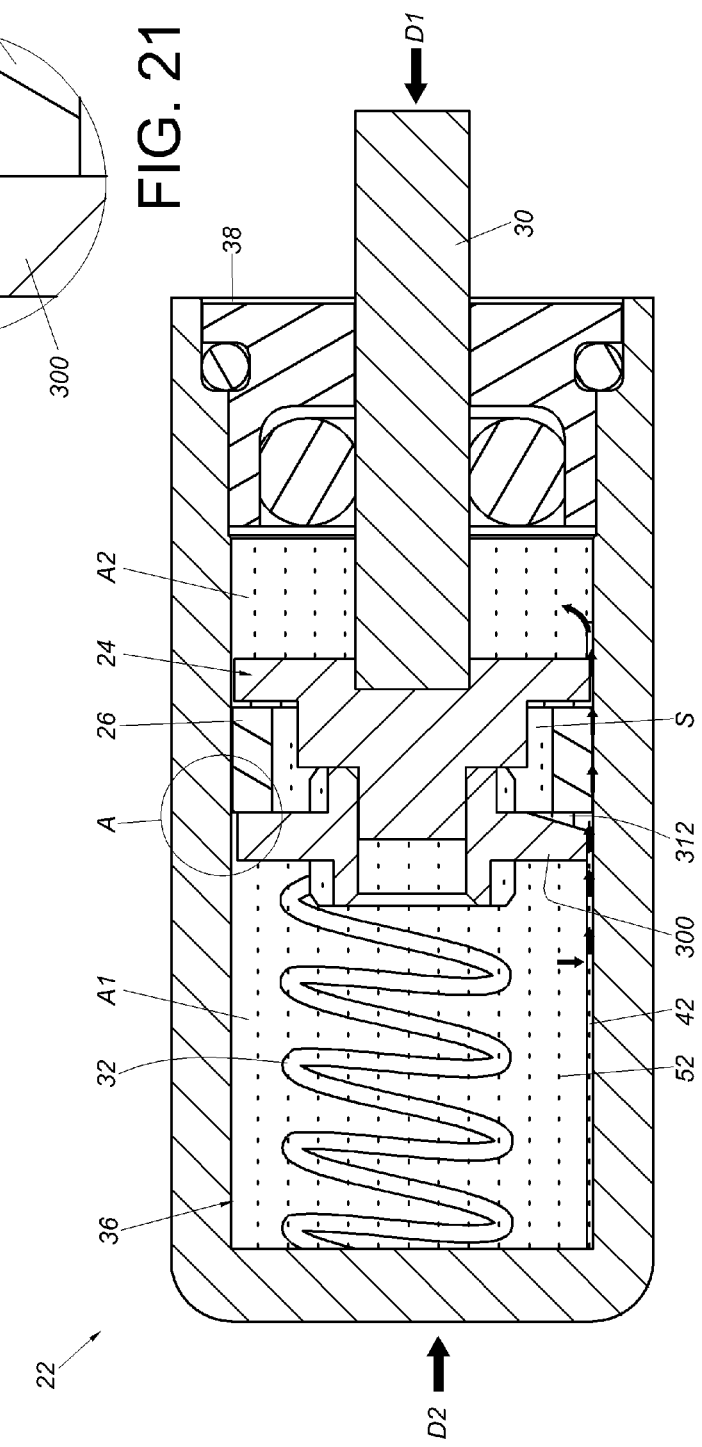

DAMPING DEVICE AND FURNITURE HINGE COMPRISING THE SAME

BACKGROUND OF THE INVENTION

1. Field of the Invention

The present invention relates to a damping device, and more particularly, to a damping device applicable to a furniture hinge.

2. Description of the Prior Art

Generally, some specific furniture, such as a door or a cabinet may be installed with a damping device. The damping can be utilized to provide damping effect when a first component is moved to switch from an open state to a close state relative to a second component, in order to mitigate movement of the first component being closed relative to the second component. For example, U.S. Pat. No. 9,021,656 B2, U.S. Pat. No. 9,057,214 B2 and U.S. Pat. No. 8,925,151 B2 discloses furniture hinges with similar techniques. U.S. Pat. No. 9,021,656 B2 discloses a furniture damper comprises a slider (13), a piston (22) and a piston rod (17). According to FIGS. 4a and 4b of U.S. Pat. No. 9,021,656 B2, an end of the piston rod (17) is connected to the piston (22), and the piston (22) is located in a fluid chamber (21). However, the piston rod and the piston are two independent components. When the piston rod and the piston are made of different materials (for example, the piston rod is made of a metal material and the piston is made of a plastic material), the piston may be damaged due to long-term use under great pressure. U.S. Pat. No. 9,057,214 B2 discloses a hinge for furniture with a decelerating device. The hinge (10) can be mounted to a piece of furniture. The hinge (10) comprises a hinge arm (12) and a box (13) swingably connected to each other. The hinge arm (12) can be fixed to a fixing part of the furniture, and the box (13) can be fixed to a door of the furniture. The hinge (10) also comprises a decelerating device (22) connected to the box (13). The decelerating device (22) comprises a slider (24) having a first cylindrical part (24') and a second cylindrical part (24"). The first cylindrical part (24') is configured to accommodate a piston (27) and a piston rod (31). The second cylindrical part (24") is configured to accommodate a return spring means (25). However, such type of the decelerating device (22) has a more complex structure due to the slider (24) having the first cylindrical part (24') and the second cylindrical part (24") for accommodating related components. Therefore, damping devices with different structures can be provided to bring more options to the market.

SUMMARY OF THE INVENTION

The present invention relates to a damping device and a furniture hinge.

According to an embodiment of the present invention, a damping device comprises a housing, a cover assembly, a piston rod, a piston and an elastic member. The housing has an inner wall defining a chamber, and an opening communicating with the chamber. The chamber is filled with a damping medium. The cover assembly is arranged adjacent to the opening of the housing. The piston rod penetrates through the cover assembly. The piston is connected to the piston rod and movable relative to the housing. The piston comprises an extension part and an expansion part located between the piston rod and the extension part, wherein a width of the expansion part is greater than a width of the piston rod. The elastic member is arranged in the chamber of the housing and configured to provide an elastic force to the piston.

According to another embodiment of the present invention, a damping device comprises a housing, a cover assembly, a piston rod, a piston, a base, a ring member and an elastic member. The housing has an inner wall defining a chamber, and an opening communicating with the chamber. The chamber is filled with a damping medium. The cover assembly is arranged adjacent to the opening of the housing. The piston rod extends out of the opening. The piston is connected to the piston rod and movable relative to the housing. The piston comprises an extension part and an expansion part located between the piston rod and the extension part, wherein the piston rod, the extension part and the expansion part are integrally formed, a width of the expansion part is greater than a width of the piston rod, and a gap is formed between the expansion part and the inner wall of the housing to allow at least one portion of the damping medium to pass through. The base is mounted to the piston and adjacent to the extension part, and the base is arranged in the chamber of the housing. The ring member is movably mounted between the expansion part of the piston and the base. The elastic member is arranged in the chamber of the housing and configured to provide an elastic force to the piston. Wherein when the piston rod is moved by a force along a first direction, the elastic member accumulates an elastic force and the ring member is located at a position relative to the expansion part of the piston for blocking the gap; and wherein when the force along the first direction no longer exists, the piston is moved along a second direction in response to the elastic force of the elastic member, such that the ring member is moved away from the position without blocking the gap.

According to another embodiment of the present invention, a damping device comprises a housing, a piston, a base and a ring member. The housing has a chamber, and an inner wall of the chamber has a groove. The chamber is filled with a damping medium. The piston is arranged in the chamber of the housing. The base is mounted to the piston. The ring member is arranged between the piston and the base. Wherein, when the housing is moved relative to the piston, the damping medium can flow within the chamber through the groove for providing damping effect.

According to another embodiment of the present invention, a furniture hinge comprises a first component, a second component and a damping device. The second component is pivoted to the first component. The damping device is mounted to one of the first component and the second component. The damping device comprises a housing, a piston, a piston rod, an elastic member and a ring member. The housing has a chamber, and an inner wall of the chamber has a groove. The chamber is filled with a damping medium. The piston is arranged in the chamber of the housing. The piston rod is connected to the piston. The elastic member is configured to provide an elastic force between the housing and the piston. The ring member is arranged in the chamber of the housing. Wherein, when the first component is moved to switch from an open state to a close state relative to the second component, the housing and the piston rod of the damping device are moved relative to each other accordingly, and the damping medium flows within the chamber through the groove for providing damping effect to mitigate movement of the first component being closed relative to the second component.

According to another embodiment of the present invention, a damping device comprises a housing, a piston, a base and a ring member. The housing has a chamber filled with a damping medium. The piston is arranged in the chamber of the housing. The base is arranged in the chamber of the housing. The ring member is arranged between the piston and the base. Wherein, a passage is formed between the ring member and the base for allowing the damping medium to flow through.

According to another embodiment of the present invention, a furniture hinge comprises a first component, a second component and a damping device. The second component is pivoted to the first component. The damping device is mounted to one of the first component and the second component. The damping device comprises a housing, a piston, a piston rod, an elastic member, a base and a ring member. The housing has a chamber filled with a damping medium. The piston is arranged in the chamber of the housing. The piston rod is connected to the piston. The elastic member is configured to provide an elastic force between the housing and the piston. The base is arranged in the chamber of the housing. The ring member is arranged between the piston and the base. Wherein, a passage is formed between the ring member and the base for allowing the damping medium to flow through.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram showing a piston rod of the damping device being moved by a force along a first direction according to the first embodiment of the present invention.

FIG. 5 is an enlarged view of an area A in FIG. 4 for illustrating a ring member configured to block a gap at a position.

FIG. 11 is a diagram showing the piston and the housing of the damping device being moved relative to each other according to the second embodiment of the present invention.

FIG. 12 is an enlarged view of an area A in FIG. 11 for illustrating the ring member configured to block a gap.

FIG. 20 is a diagram showing the piston and the housing of the damping device being moved relative to each other according to the fourth embodiment of the present invention.

FIG. 21 is an enlarged view of an area A in FIG. 21 for illustrating the ring member configured to block a gap.

DETAILED DESCRIPTION

Figure 1:
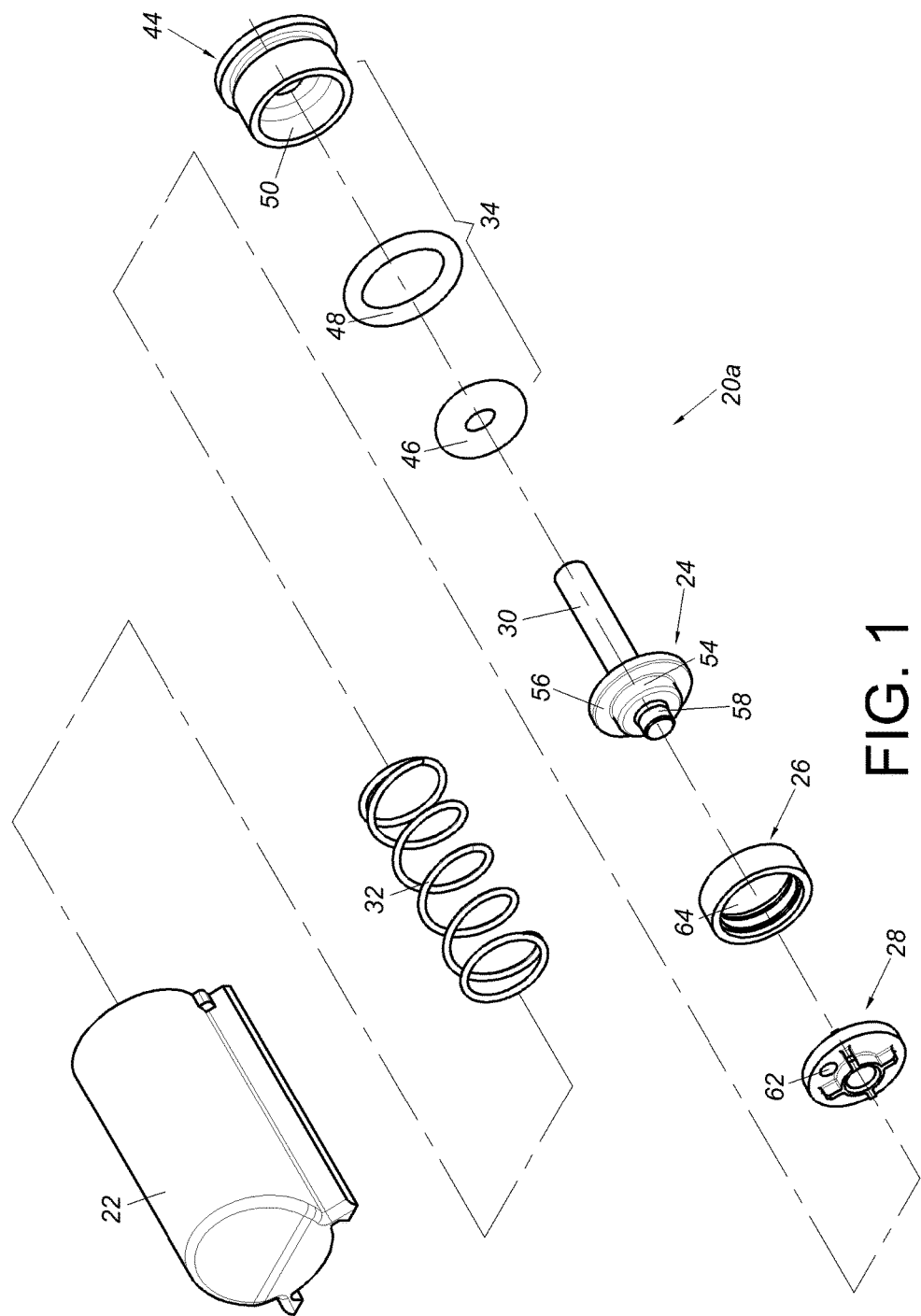
FIG. 1 is an exploded view of a damping device according to a first embodiment of the present invention.

FIG. 1 is a diagram showing a damping device 20a according to a first embodiment of the present invention. The damping device 20a comprises a housing 22, a cover assembly 34, a piston 24, a piston rod 30 and an elastic member 32. Preferably, the damping device 20a further comprises a base 28 and a ring member 26.

Figure 2:
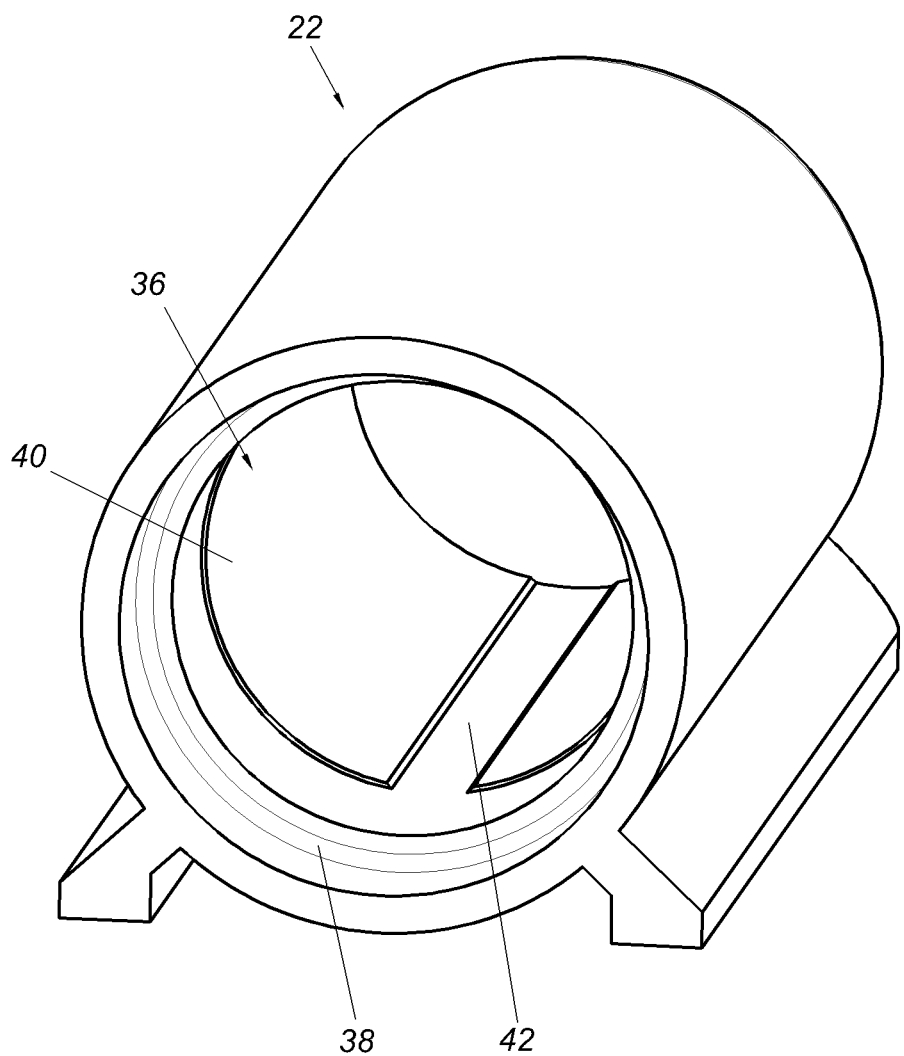
FIG. 2 is a diagram showing a housing of the damping device according to the first embodiment of the present invention.

As shown in FIG. 2, the housing 22 has an inner wall 40 defining a chamber 36, and an opening 38 communicated with the chamber 36. In the present embodiment, the housing 22 is substantially in a cylindrical shape, and the inner wall 40 of the housing 22 has is in a ring shape. Preferably, the inner wall 40 of the housing 22 has a groove 42. The groove 42 is arranged along a longitudinal direction of the housing 22. In addition, the groove 42 in FIG. 2 is shown as a rectangular groove for example, a shape of the groove 42 is not limited thereto.

Figure 3:
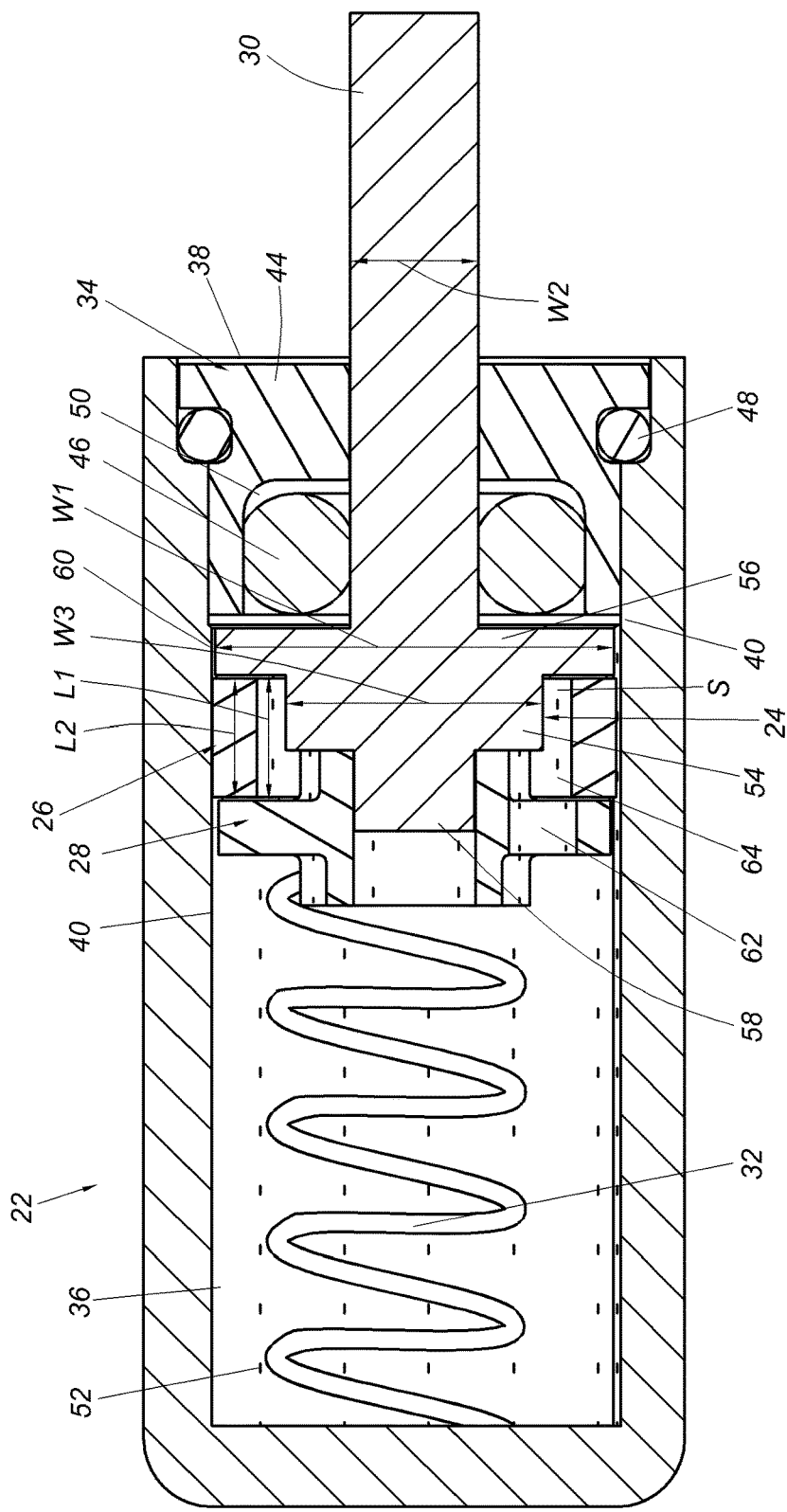
FIG. 3 is a diagram showing the damping device according to the first embodiment of the present invention.

As shown in FIG. 3, the base 28 and the piston 24 are in an initial state relative to the housing 22. The chamber 36 of the housing 22 can be filled with a damping medium 52. (In FIG. 3, a plurality of black dots are shown to represent the damping medium 52.) The damping medium 52 comprises a fluid, such as oil or a liquid substance.

The cover assembly 34 is arranged adjacent to the opening 38 of the housing 22. Preferably, the cover assembly 34 comprises a cover body 44, a sleeve member 46 and a seal ring 48. The cover body 44 provides a space 50 for accommodating the sleeve member 46. The seal ring 48 is sleeved on the cover body 44 and configured to seal the opening 38 of the housing 22.

The piston 24 is movable relative to the housing 22. The piston 24 comprises an extension part 54 and an expansion part 56 located between the piston rod 30 and the extension part 54. Preferably, the piston 24 further comprises a mounting part 58 protruded from the extension part 54. In the present embodiment, the piston 24 and the piston rod 30 can be made of a metal material. In addition, the piston rod 30, the extension part 54, the expansion part 56 and the mounting part 58 are integrally formed. Therefore, the piston 24 and the piston rod 30 of the present embodiment have better structural strength. Wherein, a width W1 of the expansion part 56 is greater than a width W2 of the piston rod 30; and a width W3 of the extension part 54 is greater than the width W2 of the piston rod 30 and smaller than the width W1 of the expansion part 56. Briefly, the relationship between W1, W2, W3 can be presented as an equation of W1>W3>W2. In addition, the piston rod 30 penetrates through the cover assembly 34. For example, the piston rod 30 penetrates through the sleeve member 46 and the cover body 44, and extends out of the opening 38 of the housing 22. A gap 60 is formed between the expansion part 56 and the inner wall 40 of the housing 22.

The elastic member 32 is arranged in the chamber 36 of the housing 22. The elastic member 32 is configured to provide an elastic force to the piston 24, in order to drive one portion of the piston rod 30 to extend out of the opening 38 of the housing 22.

The base 28 is mounted to the mounting part 58 of the piston 24 and adjacent to the extension part 54. The base 28 is arranged in the chamber 36 of the housing 22 and abuts against the elastic member 32. Preferably, the base 28 has at least one hole 62. The base 28 can be mounted to the piston 24 by fastening, engaging, screwing, sleeving or riveting.

The ring member 26 is movably mounted between the expansion part 56 of the piston 24 and the base 28. In particular, a distance L1 is defined between the expansion part 56 of the piston 24 and the base 28. A longitudinal dimension L2 of the ring member 26 is smaller than the distance L1, such that the ring member 26 can be moved between the expansion part 56 of the piston 24 and the base 28. The ring member 26 is substantially in a ring shape and is made of a flexible material. The ring member 26 has a ring-shaped opening 64 configured to allow the extension part 54 of the piston 24 to pass through. For example, a diameter of the ring-shaped opening 64 is greater than a corresponding dimension of the extension part 54 of the piston 24, in order to allow the extension part 54 to pass through the ring-shaped opening 64.

As shown in FIG. 3 and FIG. 4, when a force along a first direction D1 is applied to the piston rod 30, the piston rod 30 is moved along the first direction D1 to drive the base 28 to push the elastic member 32, such that the elastic member 32 accumulates an elastic force and one portion of the damping medium 52 is squeezed and flows toward the opening 38.

In particular, when one portion of the damping medium 52 flows toward the opening 38, the portion of the damping medium 52 can pass through the at least one hole 62 of the base 28, the ring opening 64 of the ring member 26, the groove 42 or the gap 60. Wherein, the portion of the damping medium 52 can flow from a first side of the expansion part 56 of the piston 24 to a second side of the expansion part 56 of the piston 24 through the groove 42 or the gap 60. In the present embodiment, during a process of the piston rod 30 moving along the first direction D1, the ring member 26 is located at a position P relative to the expansion part 56 of the piston 24 for blocking the gap 60 (please refer to FIG. 5 as well). Therefore, in such state, the portion of the damping medium 52 will be forced to flow to the second side of the expansion part 56 of the piston 24 through the groove 42.

Figure 6:
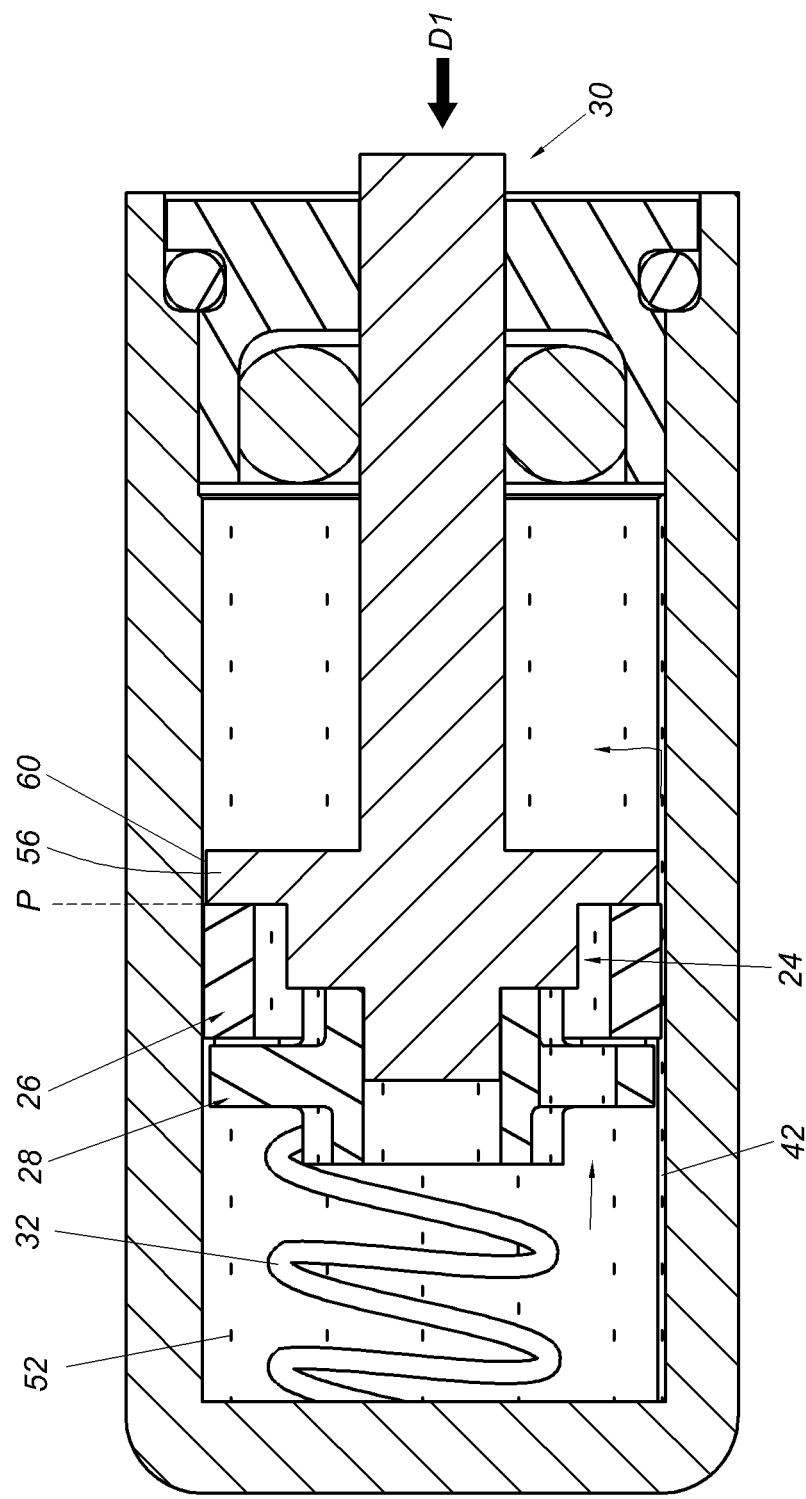
FIG. 6 is a diagram showing the piston rod of the damping device being further moved by the force along the first direction according to the first embodiment of the present invention.

As shown in FIG. 4 and FIG. 6, when the force continues to be applied to the piston rod 30 along the first direction D1, the base 28 further pushes the elastic member 32, such that the elastic member accumulates the elastic force and the portion of the damping medium 52 is squeezed and continues to flow to the second side of the expansion part 56 of the piston 24 through the groove 42.

Figure 7:
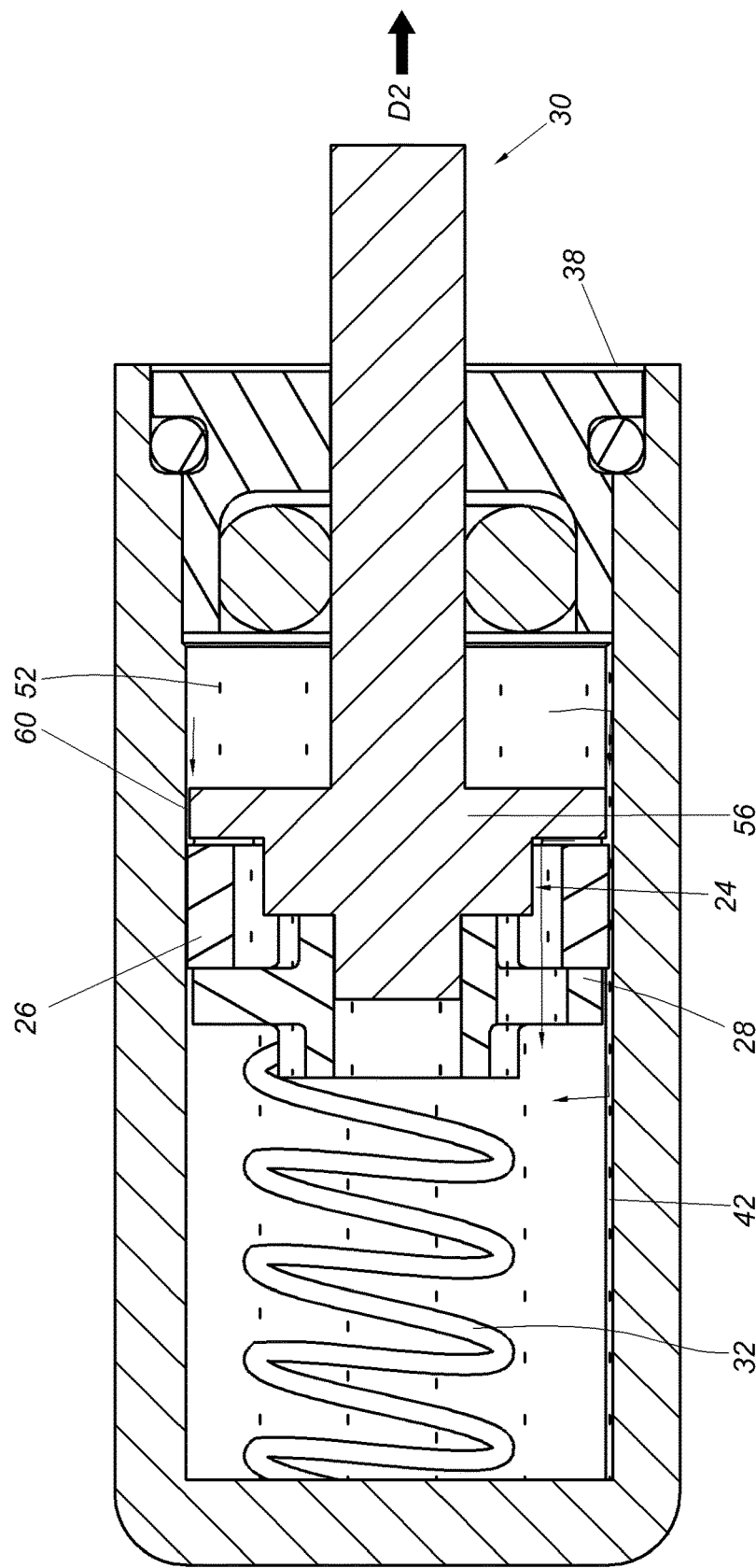
FIG. 7 is a diagram showing the piston rod of the damping device being moved along a second direction in response to an elastic force of an elastic member according to the first embodiment of the present invention.
Figure 8:
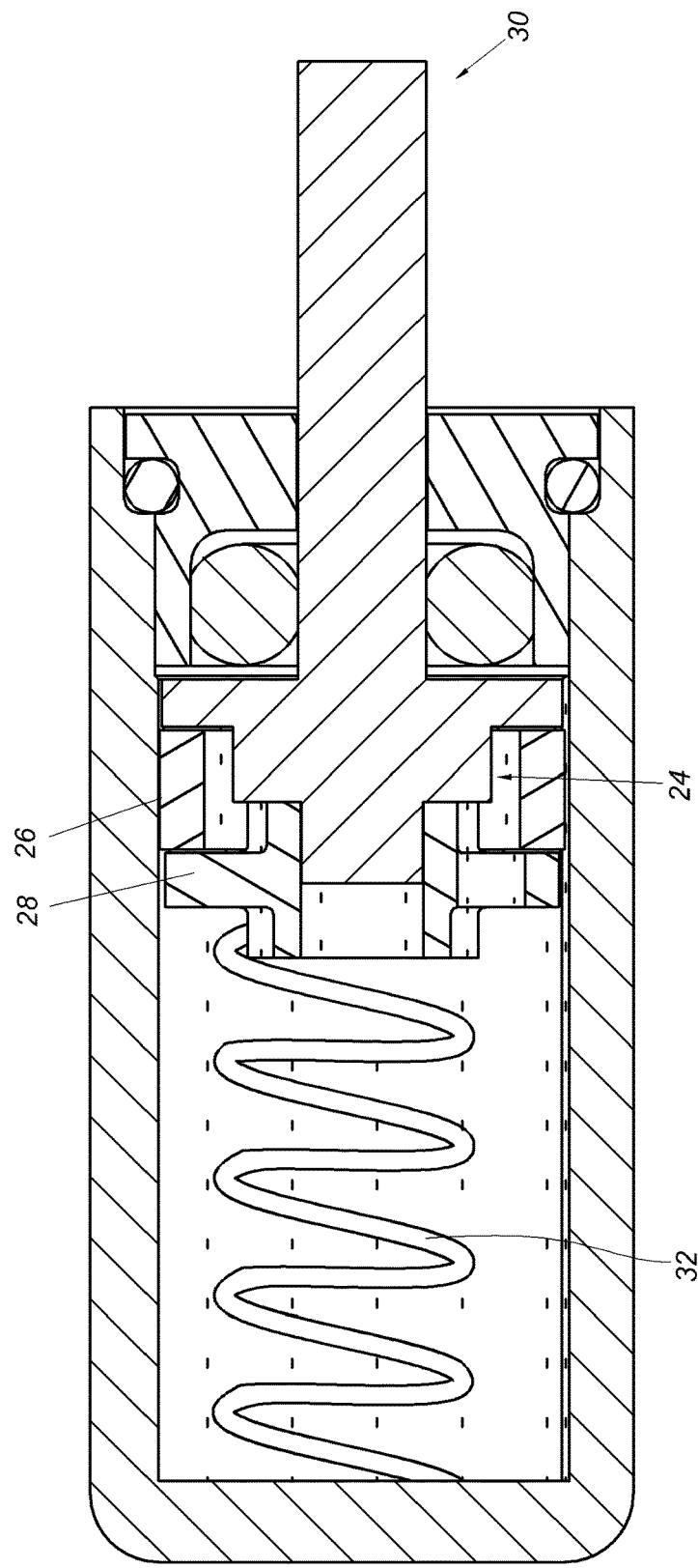
FIG. 8 is a diagram showing the piston rod of the damping device being moved to an initial state relative to the housing in response to the elastic force of the elastic member according to the first embodiment of the present invention.

As shown in FIG. 7 and FIG. 8, when the force along the first direction D1 no longer exists, the base 28 and the piston 24 are moved along a second direction D2 in response to the elastic force of the elastic member 32, wherein the second direction D2 is opposite to the first direction D1. During a process of the base 28 and the piston 24 moving along the second direction D2, one portion of the damping medium 52 is squeezed, such that the portion of the damping medium 52 flows from the second side of the expansion part 56 of the piston 24 back to the first side of the expansion part 56 along a direction away from the opening 38. In such backflow process, the portion of the damping medium 52 can pass through the gap 60; or the portion of the damping medium 52 can pass through the groove 42. Wherein, the base 28 is moved along the second direction D2 in response to the elastic force of the elastic member 32, in order to allow the ring member 26 to be close to the base 28. Specifically, the ring member 26 is moved away from the position P without blocking the gap 60, or the ring member 26 is moved by the backflow of the portion of the damping medium 52 from the position P toward the base 28 for being close to the base 28. In other words, the ring member 26 can be moved away from the position P accordingly.

In the present embodiment, the piston 24 and the piston rod 30 of the damping device 20a are integrally formed into a single component, wherein a width of the expansion part 56 of the piston rod 30 is greater than a width of the piston rod 30. In addition, the housing 22 has the groove 42 configured to allow the damping medium 52 to pass through.

Figure 9:
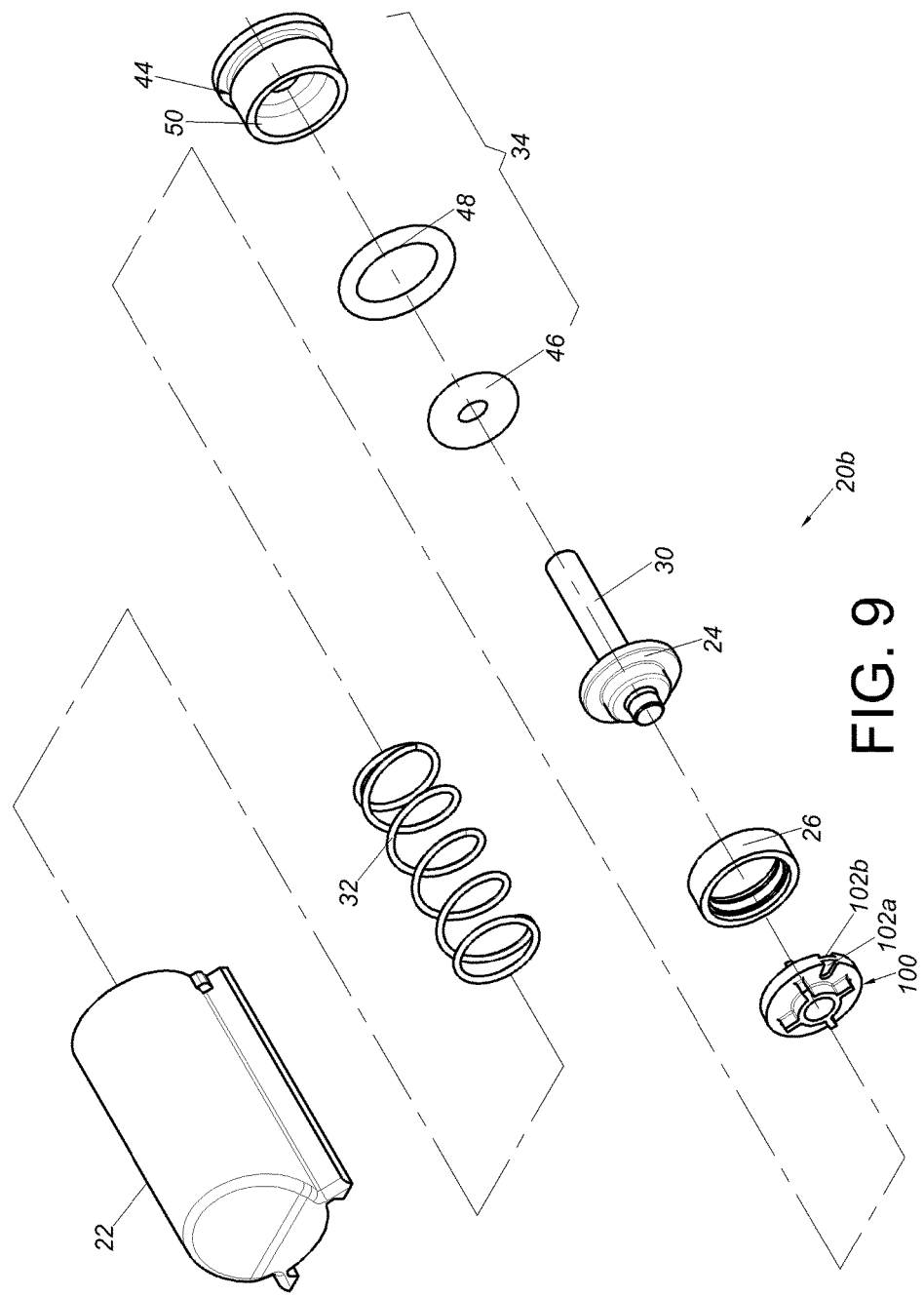
FIG. 9 is an exploded view of a damping device according to a second embodiment of the present invention.

FIG. 9 is a diagram showing a damping device 20b according to a second embodiment of the present invention.

A difference between the first embodiment and the second embodiment is that a base 100 of the second embodiment has one or more recessed parts. For example, a first recessed part 102a and a second recessed part 102b are respectively arranged at two sides of the base 100. In addition, in the present embodiment, the piston rod 30 and the piston 24 are two independent components. But the present invention is not limited thereto. Preferably, the piston rod 30 and the piston 24 can be made of a metal material. Or, the piston 24 can be made of a non-metal material.

Figure 10:
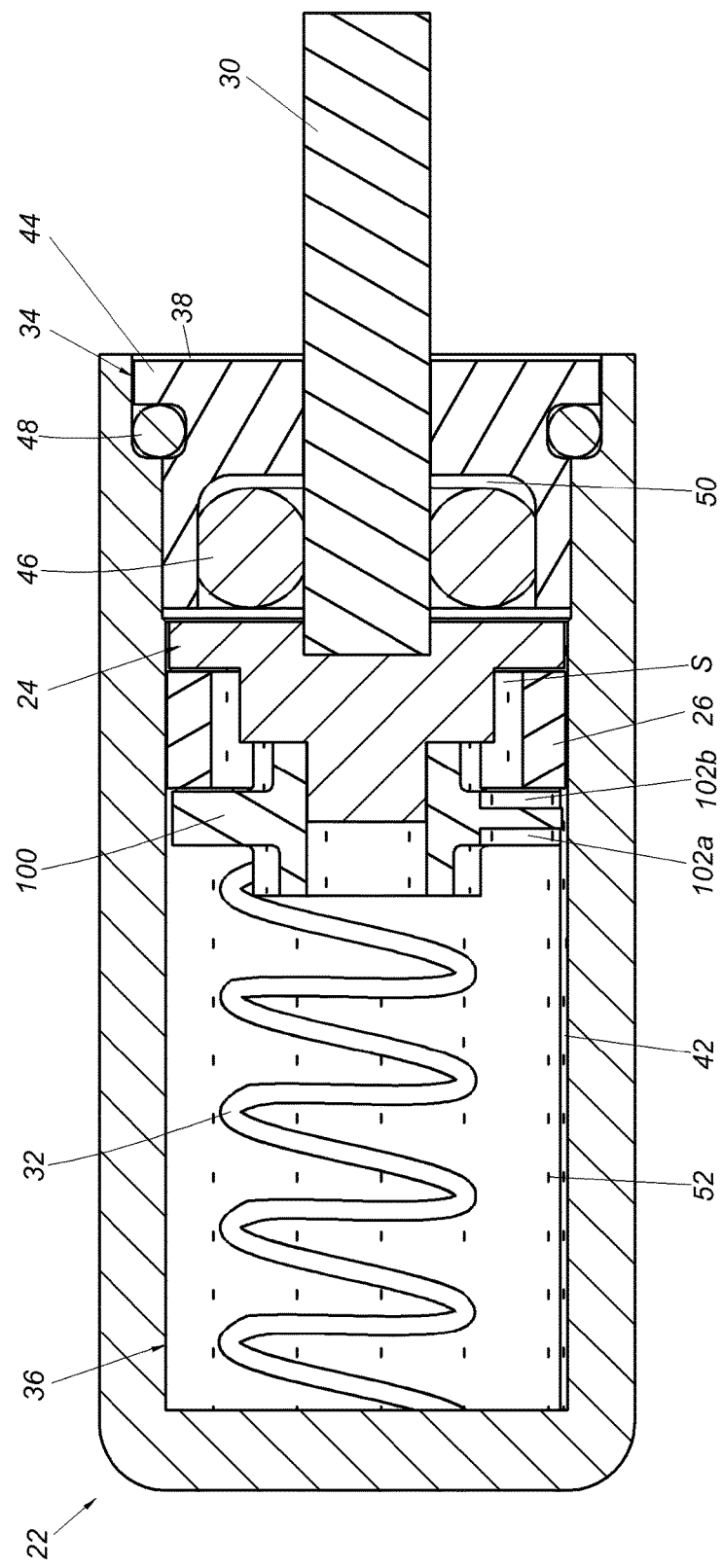
FIG. 10 is a diagram showing the damping device according to the second embodiment of the present invention.

As shown in FIG. 10 and FIG. 11, the housing 22 and the piston 24 can be moved relative to each other. For example, when the piston rod 30 is fixed (such as being fixed to an object) and a force along the second direction D2 is applied to the housing 22, the housing 22 is moved along the second direction D2, such that the housing 22 and the piston 24 can be moved relative to each other; or, when the housing 22 is fixed (such as being fixed to an object) and a force along the first direction D1 is applied to the piston rod 30, the piston rod 30 is moved along the first direction D1, such that the piston rod 30 and the housing 22 can be moved relative to each other.

In the present embodiment, the piston rod 30 is fixed for example. When the housing 22 is moved relative to the piston 24 along the second direction D2 in response to the force, the elastic member 32 accumulates an elastic force in response to a movement of the housing 22, and one portion of the damping medium 52 is squeezed to flow toward the opening 38 through the groove 42. In particular, take the piston 24 as a boundary, the damping medium 52 can flow from a first region A1 of the chamber 36 to a second region A2 of the chamber 36 through the groove 42 in order to provide damping effect. Therefore, the damping medium 52 can flow within the chamber 36 through the groove 42.

Furthermore, amounting space S is arranged between the piston 24 and the base 28. The ring member 26 is located in the mounting space S. When the damping medium 52 flows from the first region A1 to the second region A2 of the chamber 36, at least one portion of the damping medium 52 passes through the first recessed part 102a of the base 100 to enter the groove 42 and further flow to the second region A2; or, at least one portion of the damping medium 52 passes through the second recessed part 102b of the base 100 or the mounting space S to enter the groove 42 and further flow to the second region A2.

As shown in FIG. 12, the ring member 26 can be used to block other flowing paths of the damping medium 52. For example, the ring member 26 can be used to block the gap 60 between the piston 24 and the inner wall 40, such that the damping medium 52 can flow from the first region A1 to the second region A2 of the chamber 36 through the groove 42 as much as possible. In particular, the ring member 26 can be made of the flexible material. As such, when the ring member 26 is pushed by the damping medium 52 to abut against the piston 24, the ring member 26 is slightly expanded and deformed in order to block the gap 60 between the piston 24 and the inner wall 40.

Figure 13:
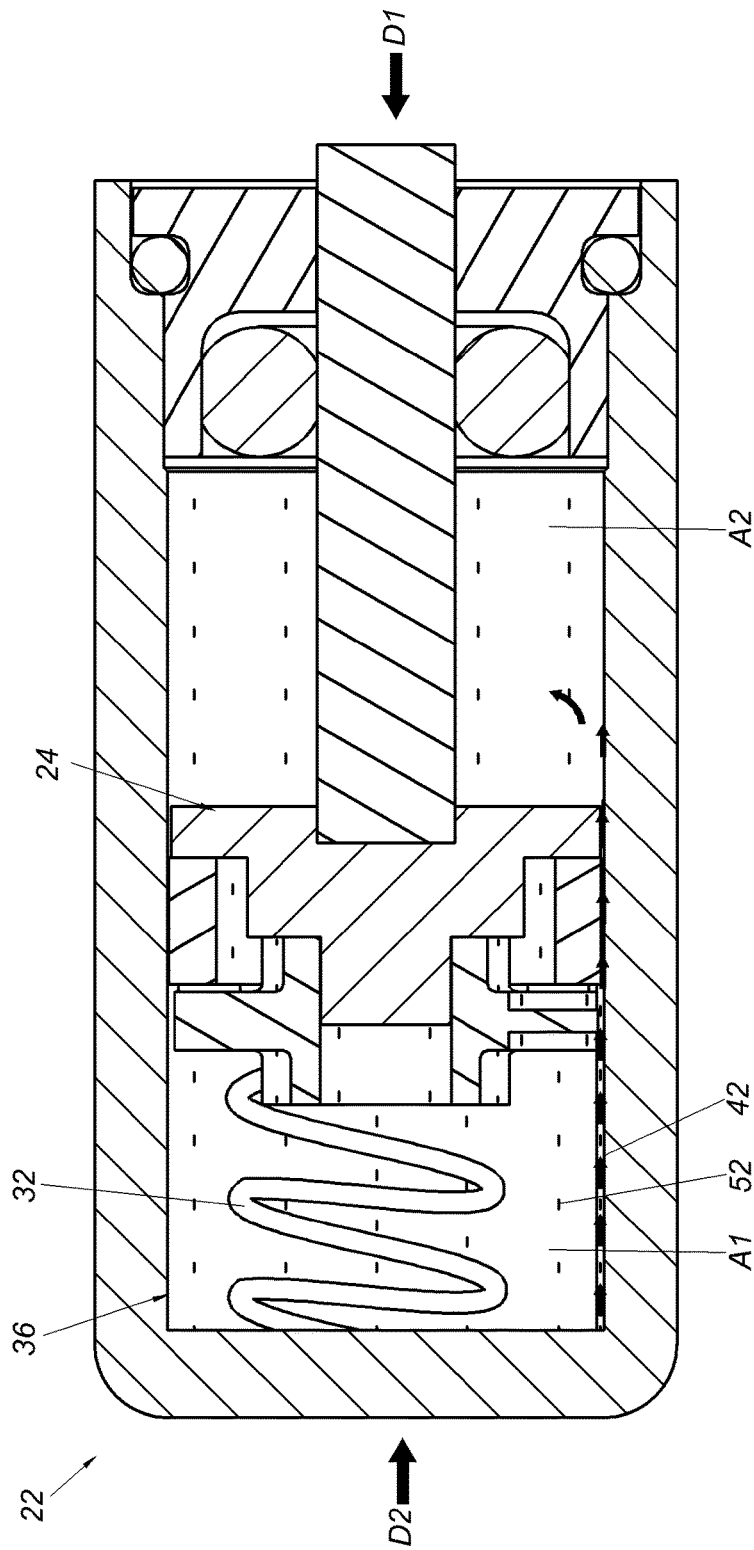
FIG. 13 is a diagram showing the piston and the housing of the damping device being further moved relative to each other according to the second embodiment of the present invention.

As shown in FIG. 11 and FIG. 13, when the force continues to be applied to the housing 22 along the second direction D2, the elastic member 32 continues to accumulate the elastic force in response to the movement of the housing 22, and the damping medium 52 further flows from the first region A1 to the second region A2 of the chamber 36 through the groove 42 in order to continue providing the damping effect. In addition, the groove 42 is arranged along a direction identical to a relative moving direction between the housing 22 and the piston 24. For example, the groove 42 is arranged in a longitudinal direction of the housing 22, and the relative moving direction between the housing 22 and the piston 24 is longitudinal.

Figure 14:
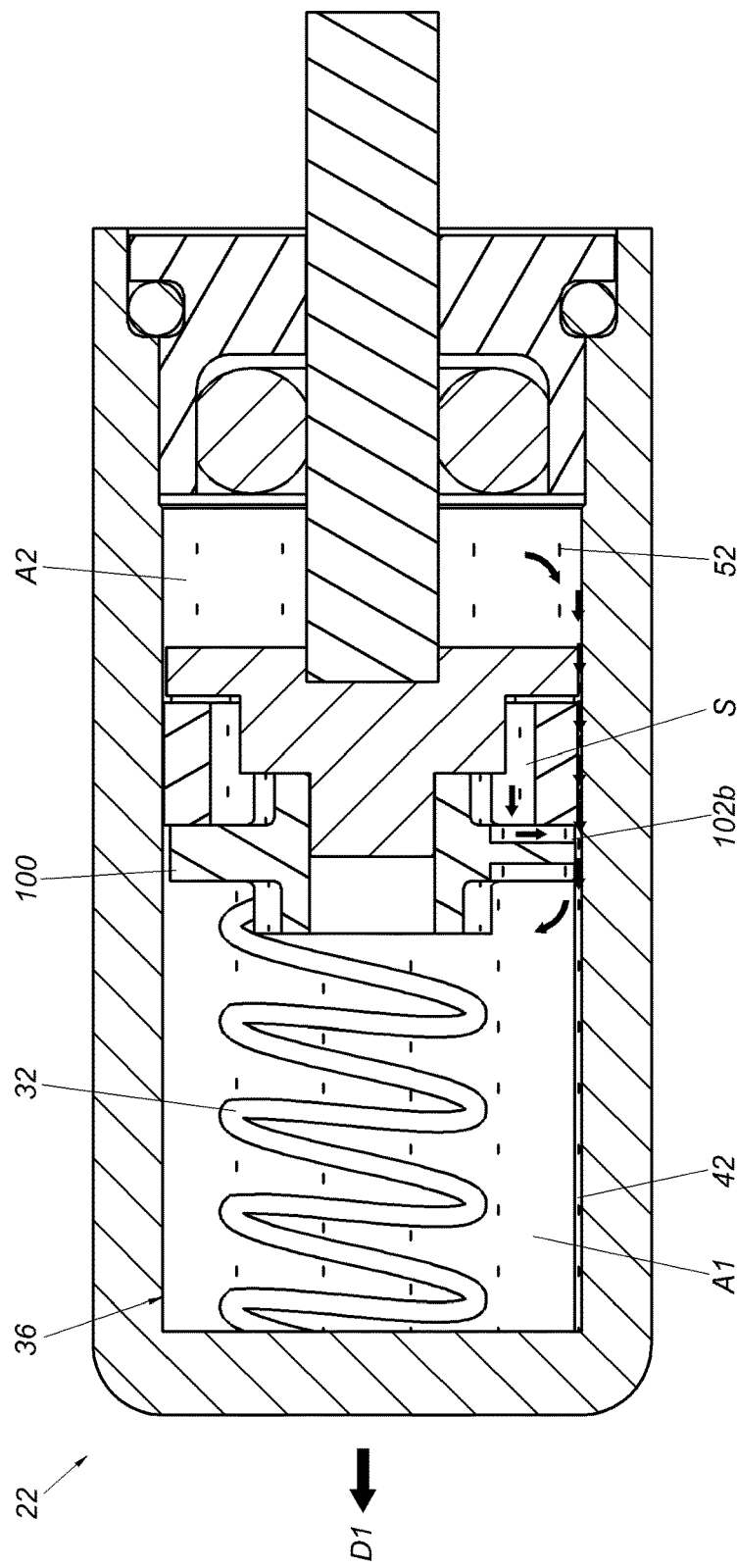
FIG. 14 is a diagram showing the housing of the damping device being moved relative to the piston in response to an elastic force of an elastic member according to the second embodiment of the present invention.
Figure 15:
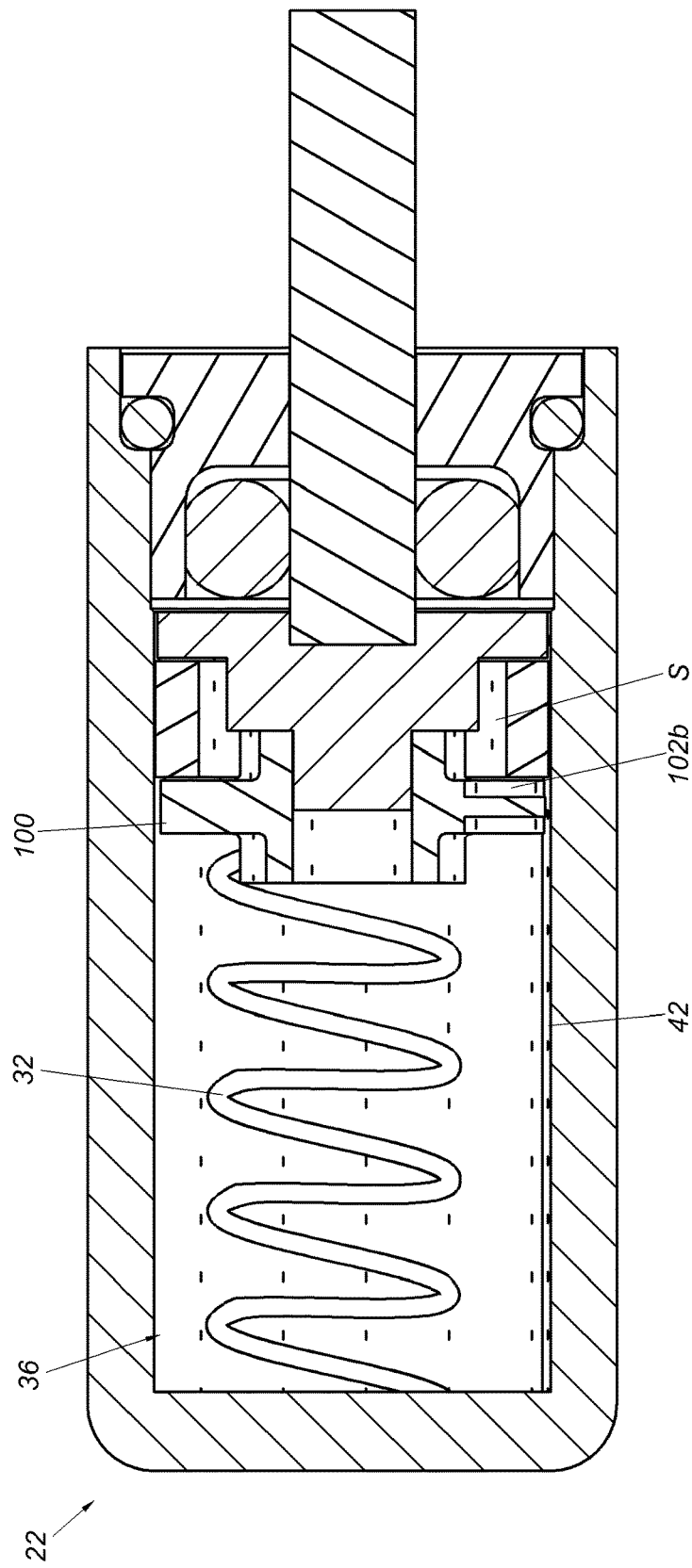
FIG. 15 is a diagram showing the housing of the damping device being moved to an initial state relative to the piston in response to the elastic force of the elastic member according to the second embodiment of the present invention.

As shown in FIG. 14 and FIG. 15, when the force along the second direction D2 no longer exists, the housing 22 is moved along the first direction D1 in response to the elastic force provided by the elastic member 32. When the housing 22 is moved along the first direction D1, the damping medium 52 flows back from the second region A2 to the first region A1 of the chamber 36 through the groove 42. In such backflow process, at least one portion of the damping medium 52 can pass through the second recessed part 102b or the mounting space S to enter the groove 42 and further flow to the first region A1, in order to increase a backflow speed of the damping medium 52.

Figure 16:
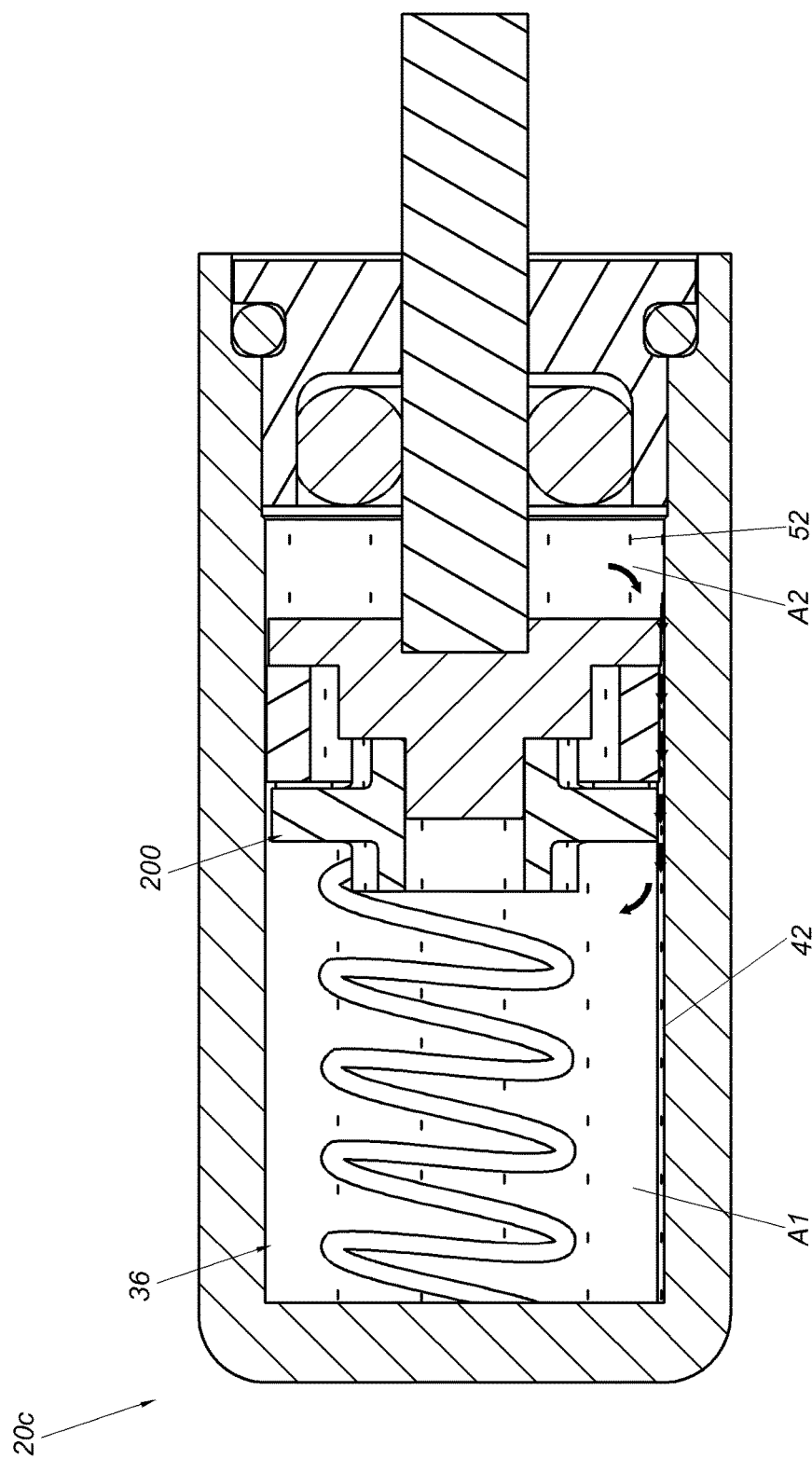
FIG. 16 is a diagram showing a damping device having a base without a recessed part according to a third embodiment of the present invention.

FIG. 16 is a diagram showing a damping device 20c according to a third embodiment of the present invention. A difference between the second embodiment and the third embodiment is that a base 200 of the third embodiment does not have a recessed part. Nevertheless, the damping medium 52 can still flow back from the second region A2 to the first region A1 of the chamber 36 through the groove 42.

Figure 17:
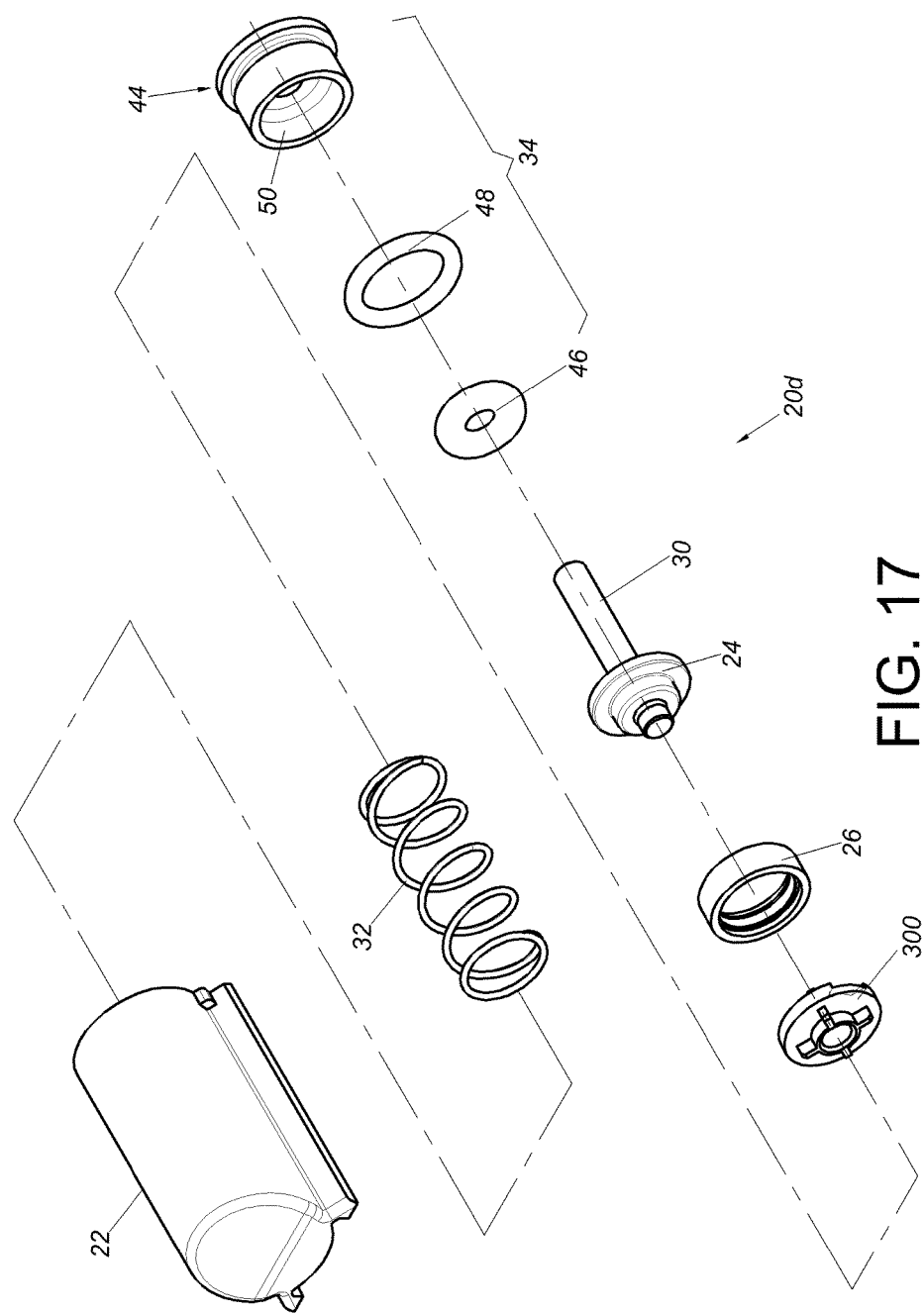
FIG. 17 is an exploded view of a damping device according to a fourth embodiment of the present invention.
Figure 18:
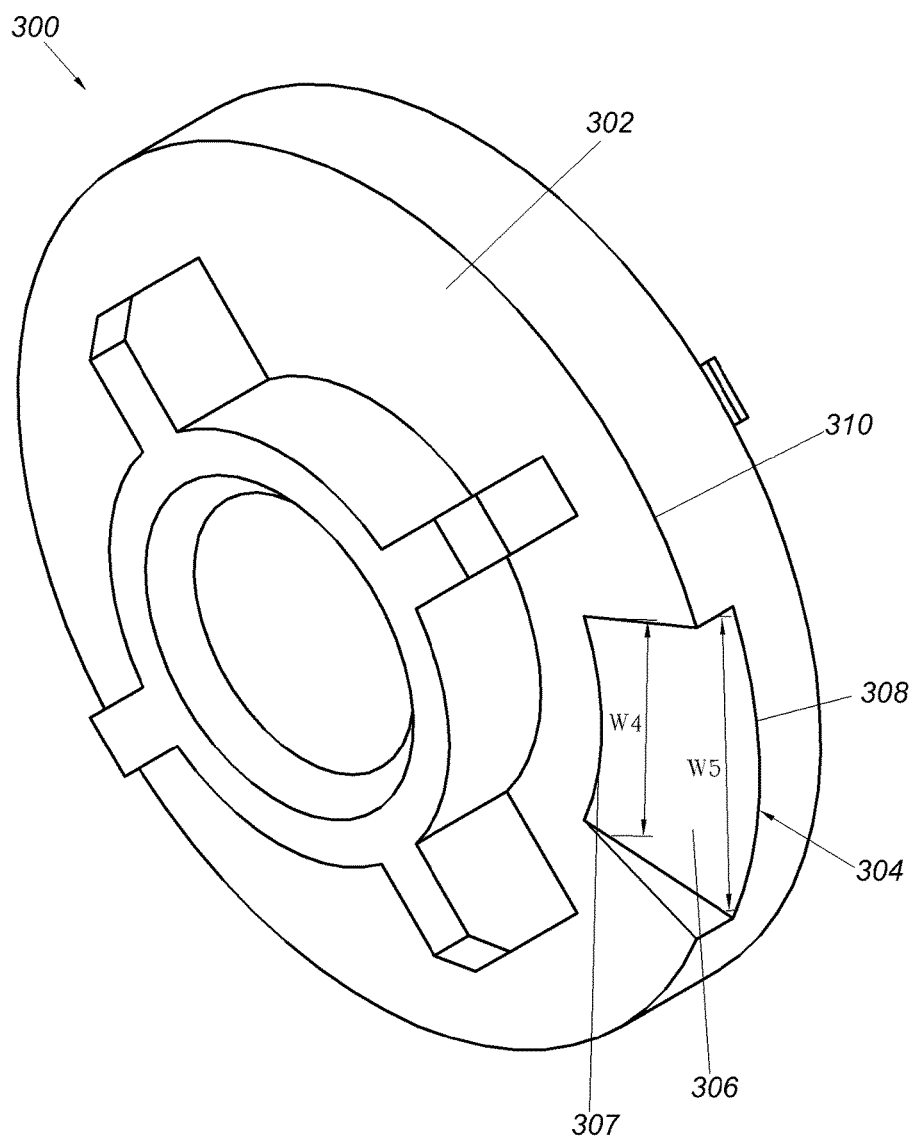
FIG. 18 is a diagram showing a base of the damping device according to the fourth embodiment of the present invention.

FIG. 17 is diagram showing a damping device 20d according to a fourth embodiment of the present invention. FIG. 18 is a diagram showing a base 300 of the damping device according to the fourth embodiment of the present invention. A difference between the fourth embodiment and the aforementioned embodiment is that a base 300 of the fourth embodiment has a surface 302, and the surface 302 has at least one recessed part 304. Preferably, the at least one recessed part 304 has an inclined surface 306 inclined relative to the surface 302. The inclined surface 306 is extended to a periphery 310 of the base 300, such as an edge. Preferably, the inclined surface 306 has a top part 307 and a bottom part 308. The bottom part 308 is arranged at the periphery 310 of the base 300. A width W4 of the top part is smaller than a width W5 of the bottom part of the inclined surface 306.

Figure 19:
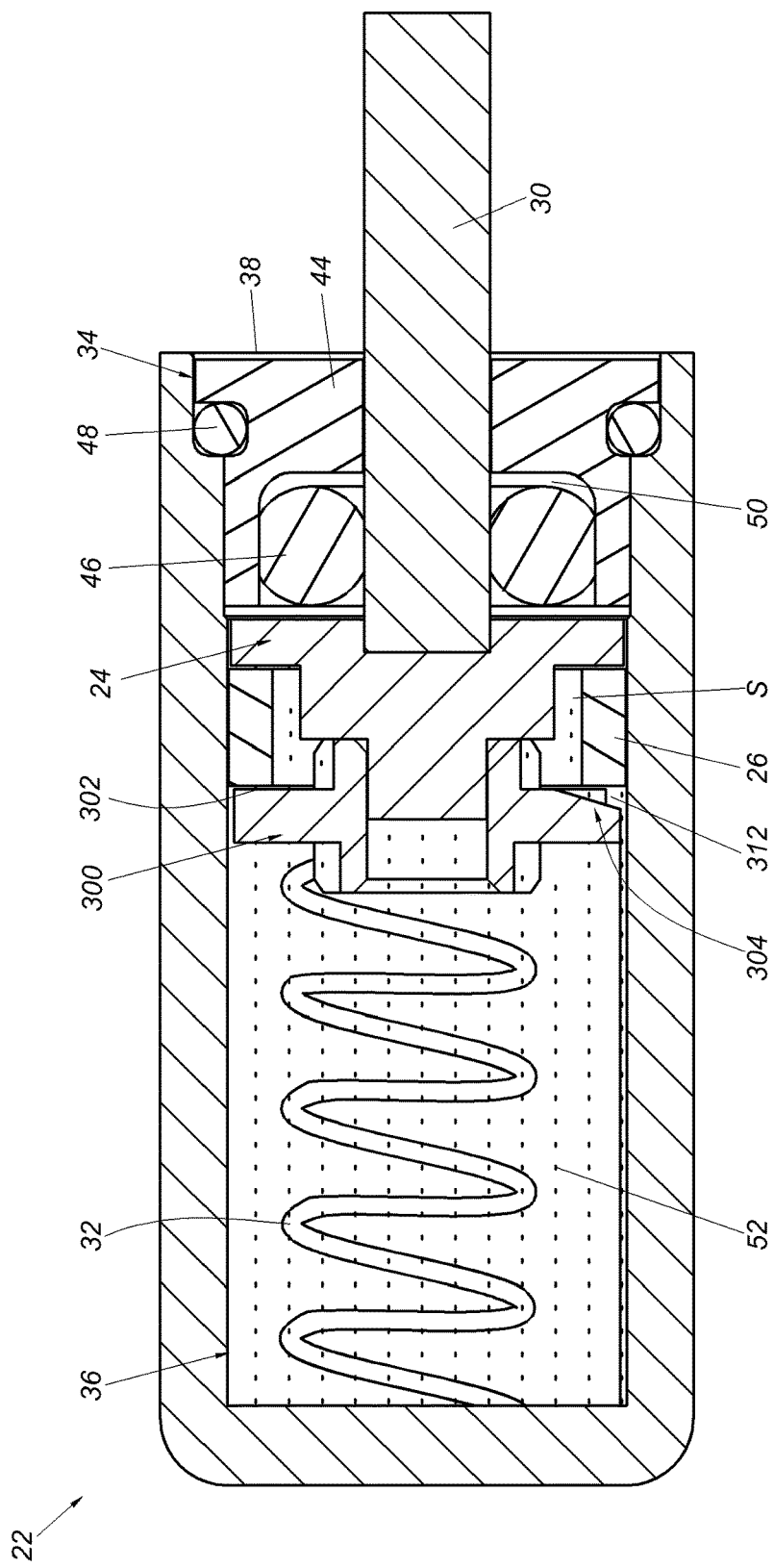
FIG. 19 is a diagram showing the damping device according to the fourth embodiment of the present invention.

As shown in FIG. 19, the surface 302 of the base 300 is configured to face the ring member 26. A passage 312 is formed between the ring member 26 and the base 300. Preferably, the at least one recessed part 304 of the base 300 is configured to allow the passage 312 to be formed between the ring member 26 and the base 300.

The piston rod 30 is connected to the piston 24, and one portion of the piston rod 30 passes through the sleeve member 46 and the cover body 44. Preferably, the piston rod 30 and the piston 24 can be integrally formed; or the piston rod 30 and the piston 24 can be two independent components and connected to each other by a corresponding structure (such as by screwing or engaging). Wherein, the piston rod 30 and the piston 24 can be made of a metal material. Or, the piston 24 can be made of a non-metal material.

The elastic member 32 is configured to provide an elastic force between the housing 22 and the piston 24. Wherein, the piston 24 can be held at a predetermined position in response to the elastic force of the elastic member 32, in order to allow the portion of the piston rod 30 to stay extending out of the opening 38 of the housing 22. Preferably, the elastic member 32 is arranged in the chamber 36 of the housing 22, and the base 28 abuts against the elastic member 32.

As shown in FIG. 19 and FIG. 20, the housing 22 and the piston 24 can be moved relative to each other. For example, when the piston rod 30 is fixed (such as being fixed to an object) and a force along the second direction D2 is applied to the housing 22, the housing 22 is moved along the second direction D2, such that the housing 22 and the piston 24 can be moved relative to each other; or, when the housing 22 is fixed (such as being fixed to an object) and a force along the first direction D1 is applied to the piston rod 30, the piston rod 30 is moved along the first direction D1, such that the piston rod 30 and the housing 22 can be moved relative to each other.

In the present embodiment, the piston rod 30 is fixed for example. When the housing 22 is moved relative to the piston 24 along the second direction D2 in response to the force, the elastic member 32 accumulates an elastic force in response to a movement of the housing 22 and one portion of the damping medium 52 is squeezed to flow toward the opening 38 through the groove 42. In particular, take the piston 24 as a boundary, the damping medium 52 can flow from a first region A1 of the chamber 36 to a second region A2 of the chamber 36 through the groove 42 in order to provide damping effect.

Furthermore, when the damping medium 52 flows from the first region A1 to the second region A2 of the chamber 36, at least one portion of the damping medium 52 passes through the passage 312 between the ring member 26 and the base 300 to enter the groove 42 and further flow to the second region A2; or, at least one portion of the damping medium 52 passes through the mounting space S to enter the groove 42 and further flow to the second region A2.

As shown in FIG. 21, the ring member 26 can be used to block other flowing paths of the damping medium 52. For example, the ring member 26 can be used to block a gap 65 between the base 300 and the inner wall 40, such that the damping medium 52 can flow from the first region A1 to the second region A2 of the chamber 36 through the groove 42 as much as possible. In particular, the ring member 26 can be made of the flexible material. As such, when the ring member 26 is pushed by the damping medium 52 to abut against the piston 24, the ring member 26 is slightly expanded and deformed in order to block the gap 65 between the base 300 and the inner wall 40.

Figure 22:
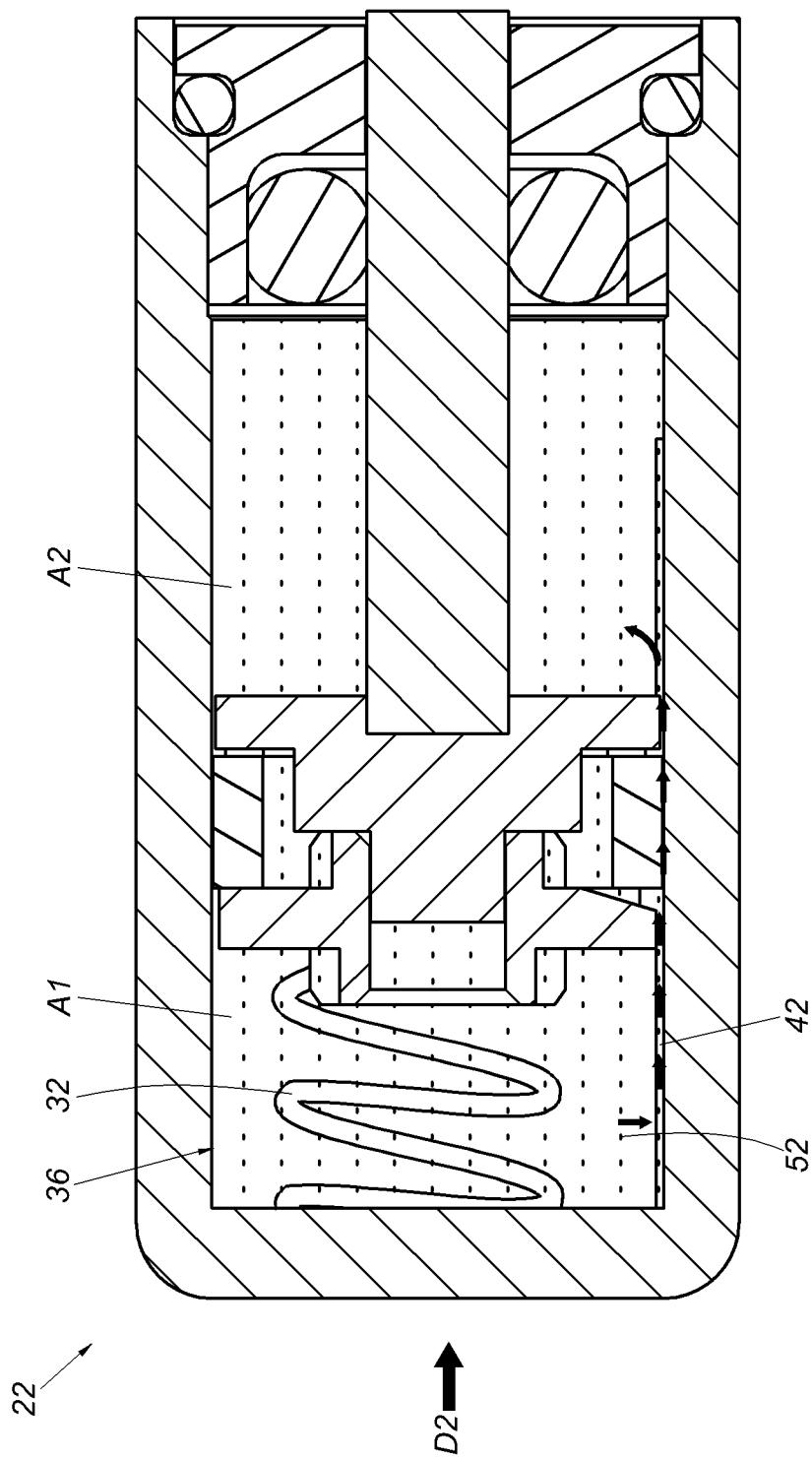
FIG. 22 is a diagram showing the piston and the housing of the damping device being further moved relative to each other according to the fourth embodiment of the present invention.

As shown in FIG. 20 and FIG. 22, when the force continues to be applied to the housing 22 along the second direction D2, the elastic member 32 continues to accumulate the elastic force in response to the movement of the housing 22, and the damping medium 52 further flows from the first region A1 to the second region A2 of the chamber 36 through the groove 42 in order to continue providing the damping effect. In addition, the groove 42 is arranged along a direction identical to a relative moving direction between the housing 22 and the piston 24. For example, the groove 42 is arranged in a longitudinal direction of the housing 22, and the relative moving direction between the housing 22 and the piston 24 is longitudinal.

Figure 23:
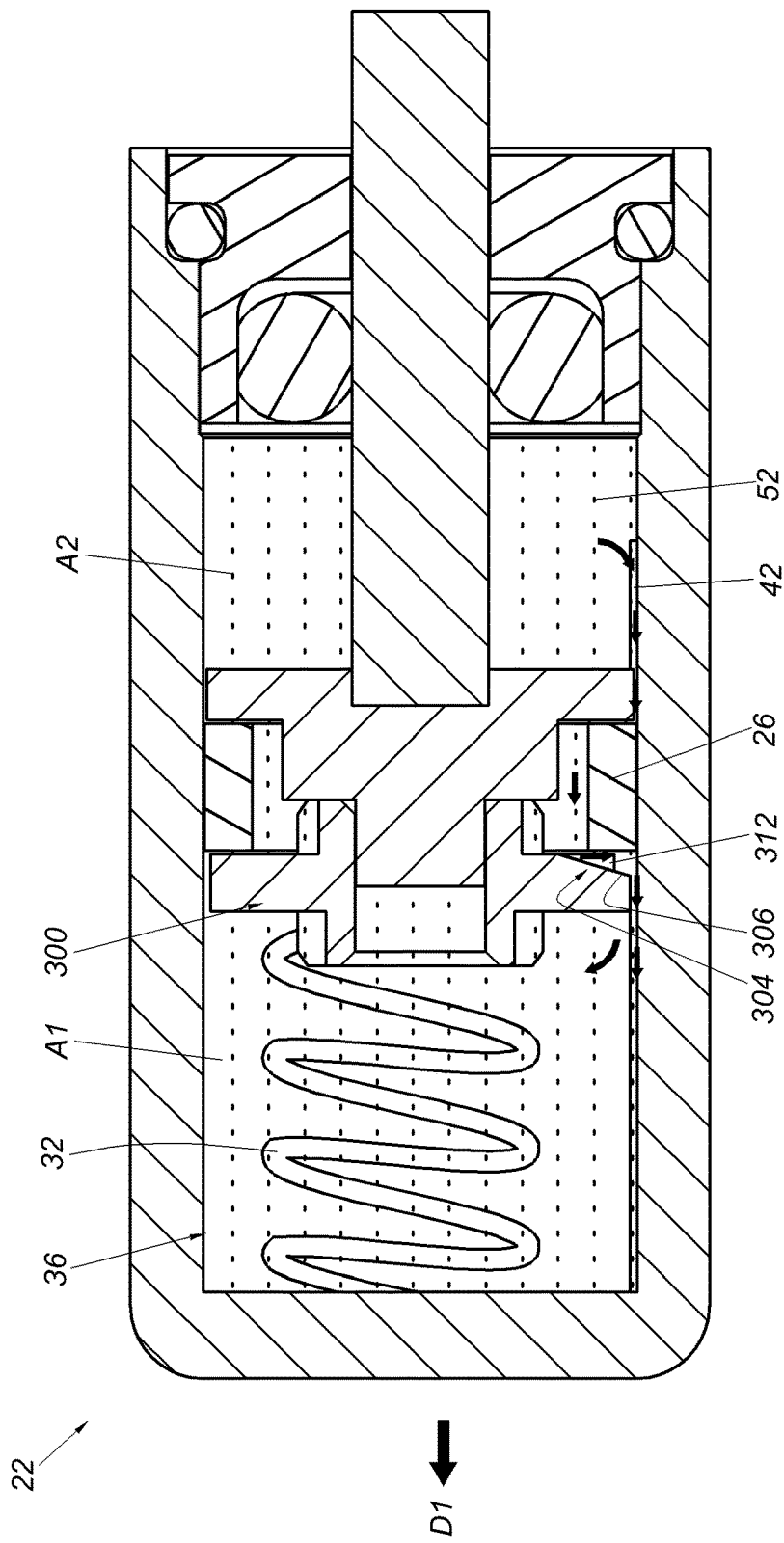
FIG. 23 is a diagram showing the housing of the damping device being moved relative to the piston in response to the elastic force of the elastic member according to the fourth embodiment of the present invention.
Figure 24:
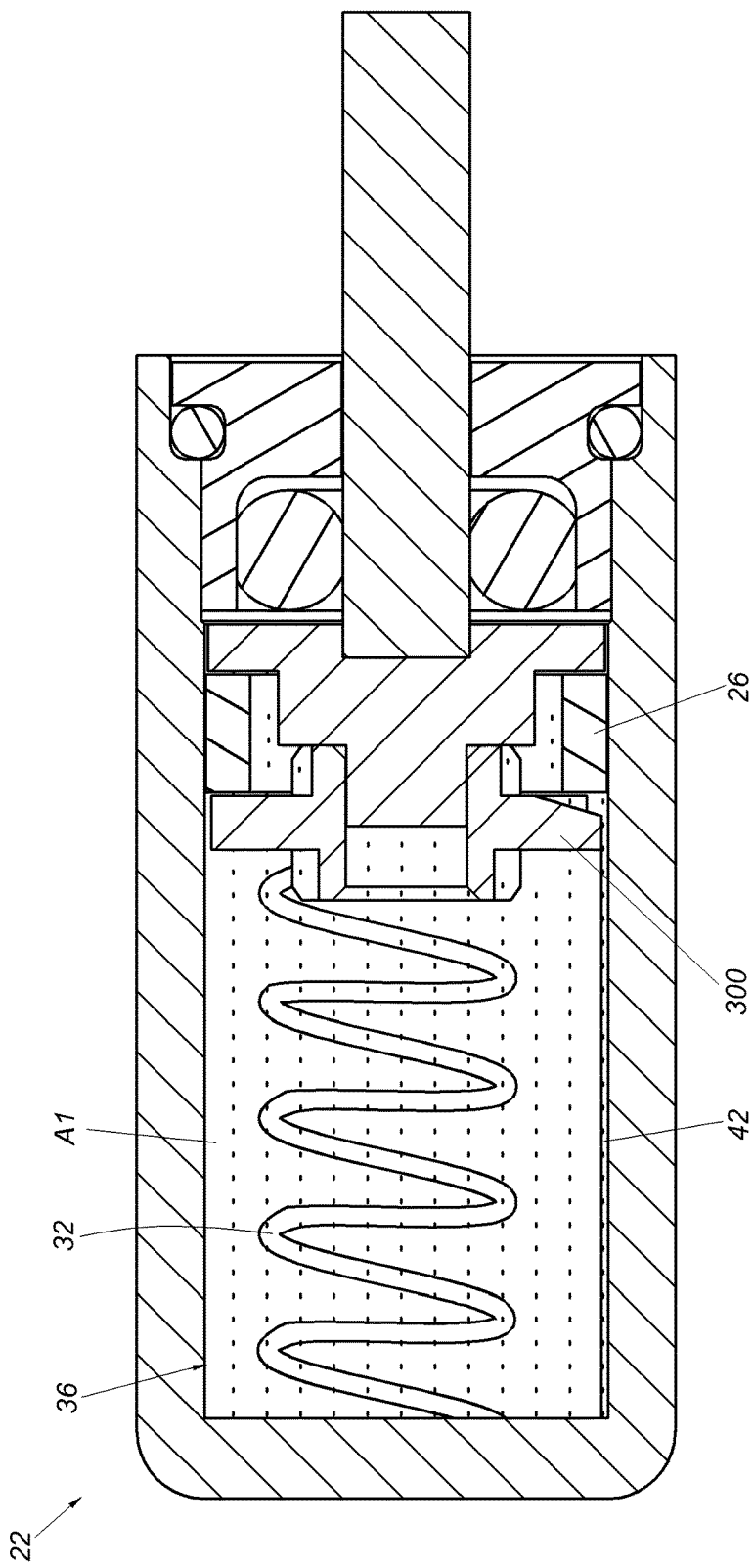
FIG. 24 is a diagram showing the housing of the damping device being moved to an initial state relative to the piston in response to the elastic force of the elastic member according to the fourth embodiment of the present invention.

As shown in FIG. 23 and FIG. 24, when the force along the second direction D2 no longer exists, the housing 22 is moved along the first direction D1 in response to the elastic force provided by the elastic member 32. When the housing 22 is moved along the first direction D1, the damping medium 52 flows back from the second region A2 to the first region A1 of the chamber 36 through the groove 42. In such backflow process, at least one portion of the damping medium 52 can pass through the passage 312 between the ring member 26 and the base 300 to enter the groove 42 and further flow to the first region A1. Wherein, the inclined surface 306 of the recessed part 304 of the base 28 is configured to increase a backflow speed of the damping medium 52.

Figure 25:
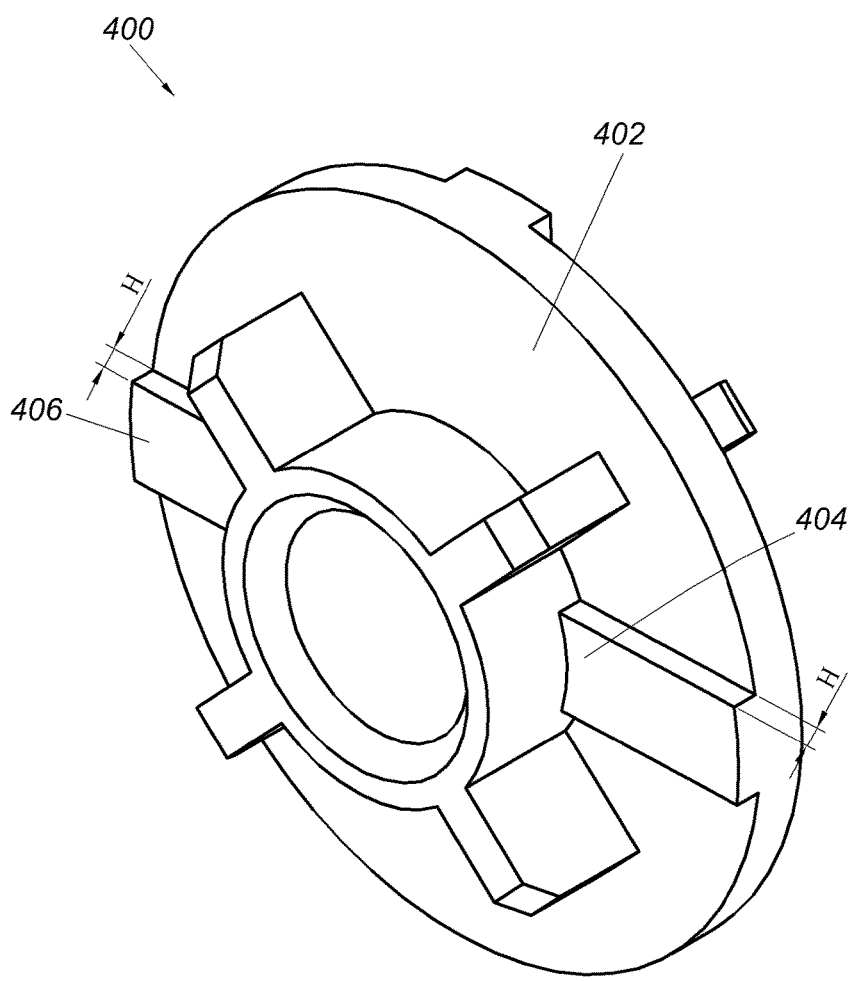
FIG. 25 is a diagram showing a base of a damping device according to a fifth embodiment of the present invention.

FIG. 25 is a diagram showing a base 400 of a damping device according to a fifth embodiment of the present invention. The base 400 has a surface 402, and at least one rib protruded from the surface 402. In the present embodiment, a first rib 404 and a second rib 406 are shown for example. The first rib 404 and the second rib 406 have a height H relative to the surface 406.

Figure 26:
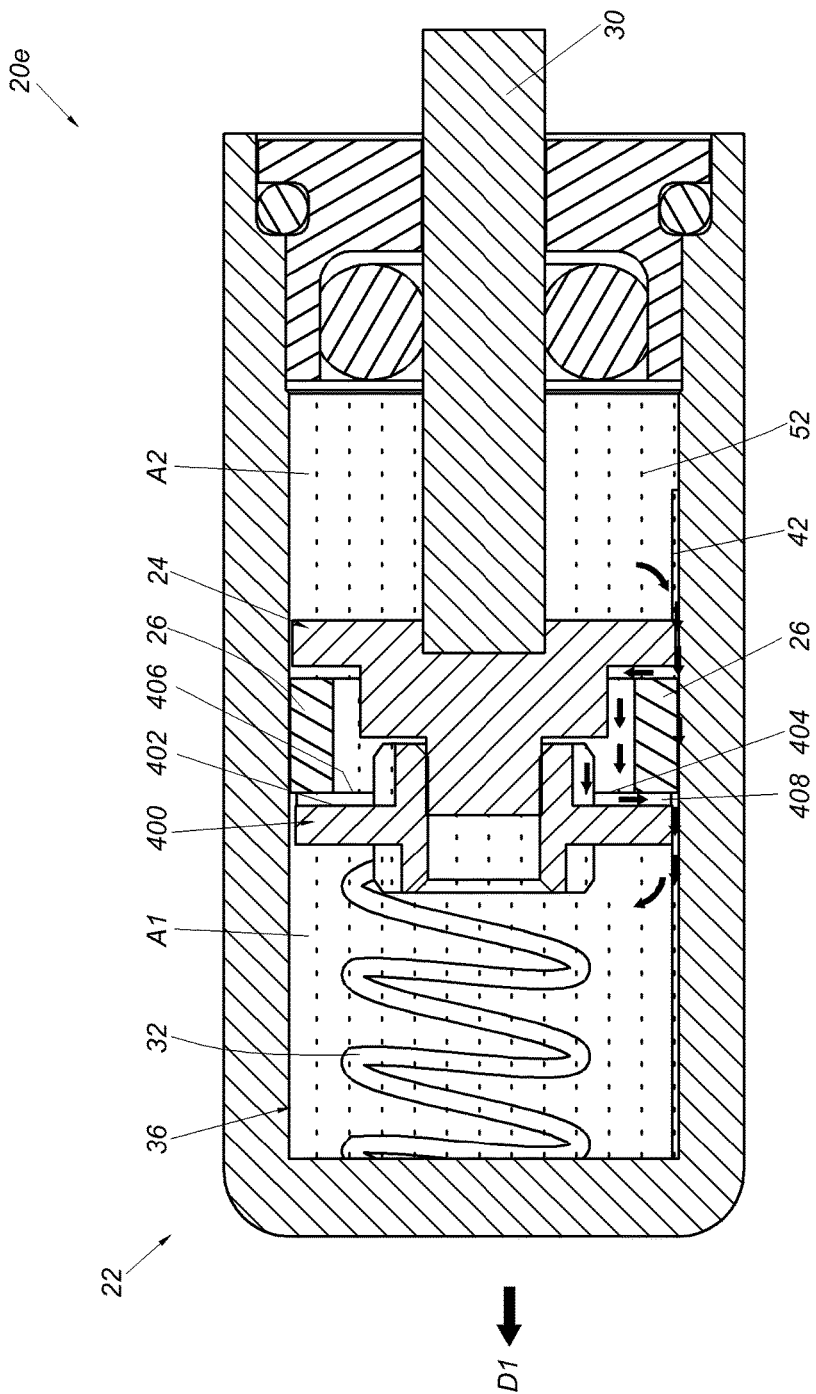
FIG. 26 is a diagram showing the housing of the damping device being moved relative to the piston in response to the elastic force of the elastic member according to the fifth embodiment of the present invention.

As shown in FIG. 26, in the damping device 20e of the fifth embodiment of the present invention, the surface 402 of the base 400 is configured to face the ring member 26, and the ring member 26 is configured to abut against the first rib 404 and the second rib 406 in order to form a passage 408 between the ring member 26 and the surface 402 of the base 400. When the housing 22 is moved relative to the piston 24 (or the piston rod 30) along the first direction D1 in response to the elastic force of the elastic member 32, the damping medium 52 flows back from the second region A2 to the first region A1 of the chamber 36 through the groove 42. In such backflow process, at least one portion of the damping medium 52 can pass through the passage 408 to enter the groove 42 and further flow to the first region A1. Therefore, with one more path provided to allow the damping medium 52 to pass through, the backflow speed of the damping medium 52 can be increased accordingly.

Figure 27:
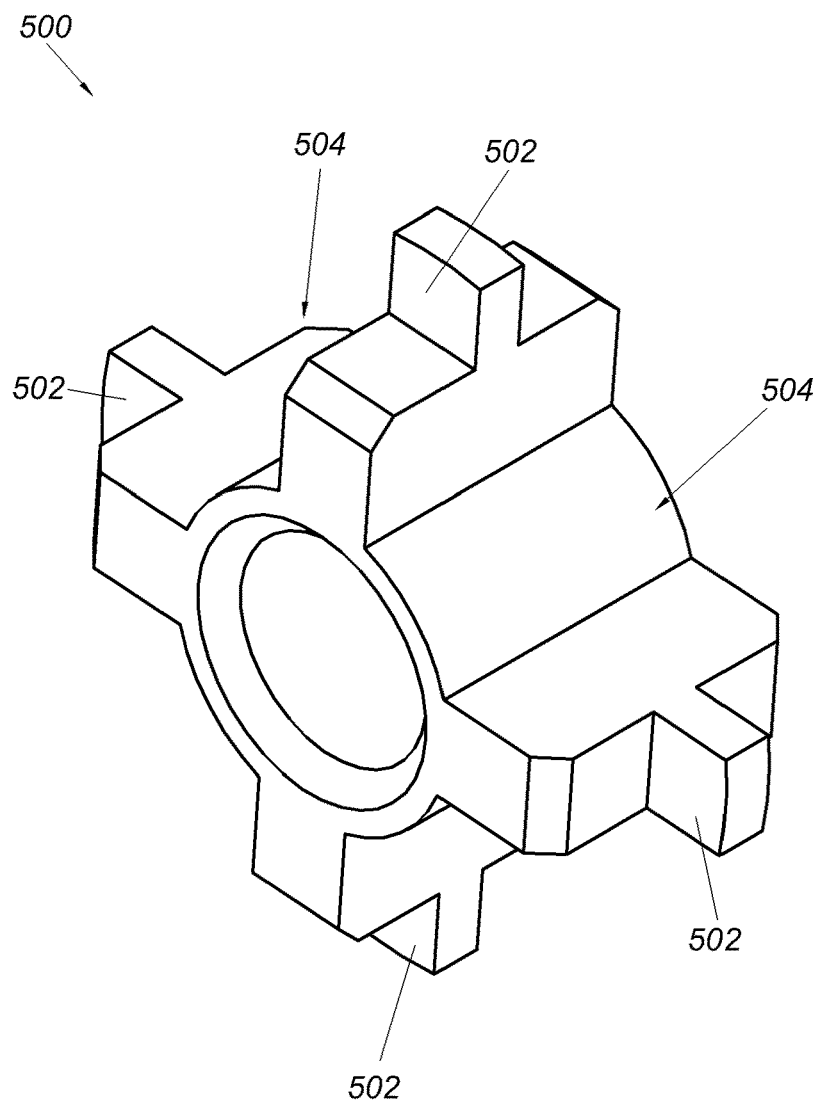
FIG. 27 is a diagram showing a base of a damping device according to a sixth embodiment of the present invention.

FIG. 27 is a diagram showing a base 500 of a damping device according to a sixth embodiment of the present invention. The base 500 comprises a plurality of protrusions 502. A passage 504 is formed between two adjacent protrusions 502. In the present embodiment, the plurality of protrusions 502 are symmetrically arranged, but the present invention is not limited thereto.

Figure 28:
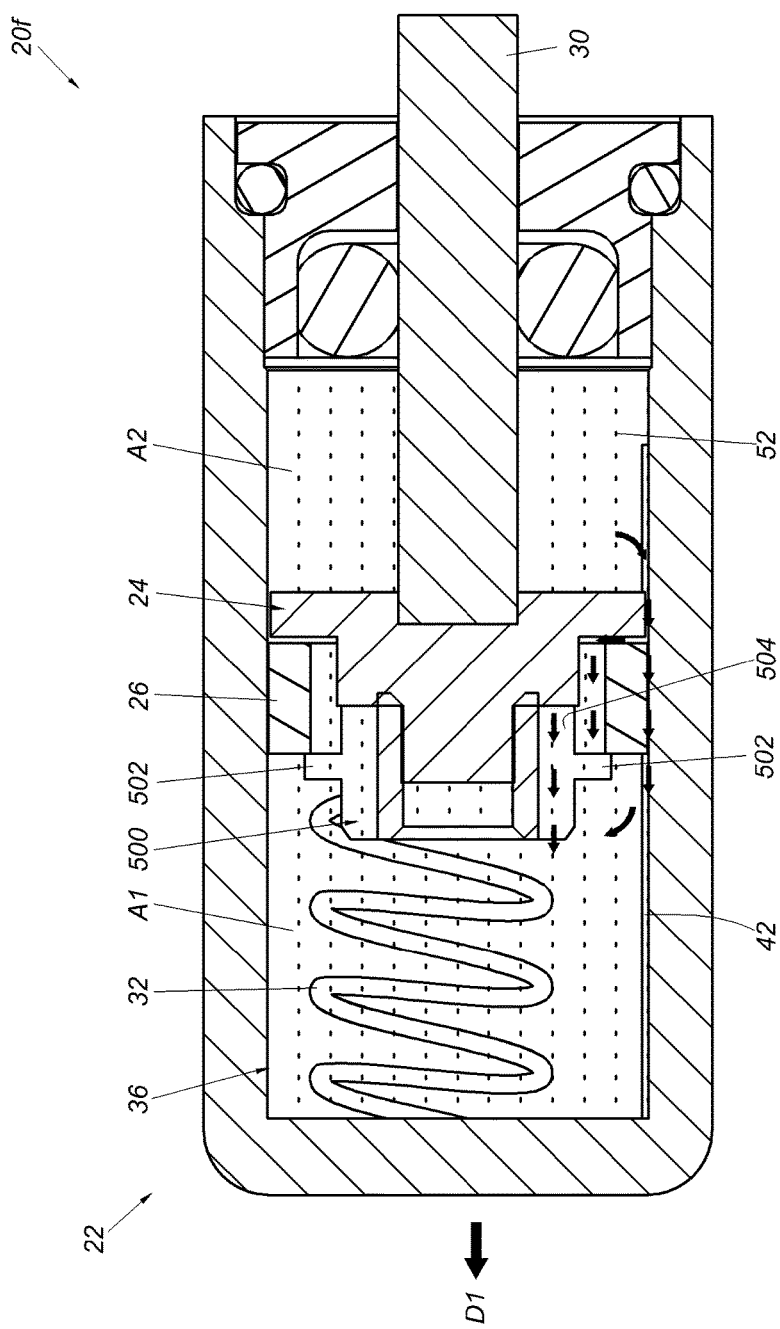
FIG. 28 is a diagram showing the housing of the damping device being moved relative to the piston in response to the elastic force of the elastic member according to the sixth embodiment of the present invention.

As shown in FIG. 28, in the damping device 20f of the sixth embodiment of the present invention, the plurality of protrusions 502 of the base 500 are configured to abut against the ring member 26. When the housing 22 is moved relative to the piston 24 (or the piston rod 30) along the first direction D1 in response to the elastic force of the elastic member 32, the damping medium 52 flows back from the second region A2 to the first region A1 of the chamber 36 through the groove 42. In such backflow process, at least one portion of the damping medium 52 can pass through the passage 504 and directly flows to the first region A1; or, at least one portion of the damping medium 52 can enter the groove 42 and further flow to the first region A1. Therefore, with one more path provided to allow the damping medium 52 to pass through, the backflow speed of the damping medium 52 can be increased accordingly.

Figure 29:
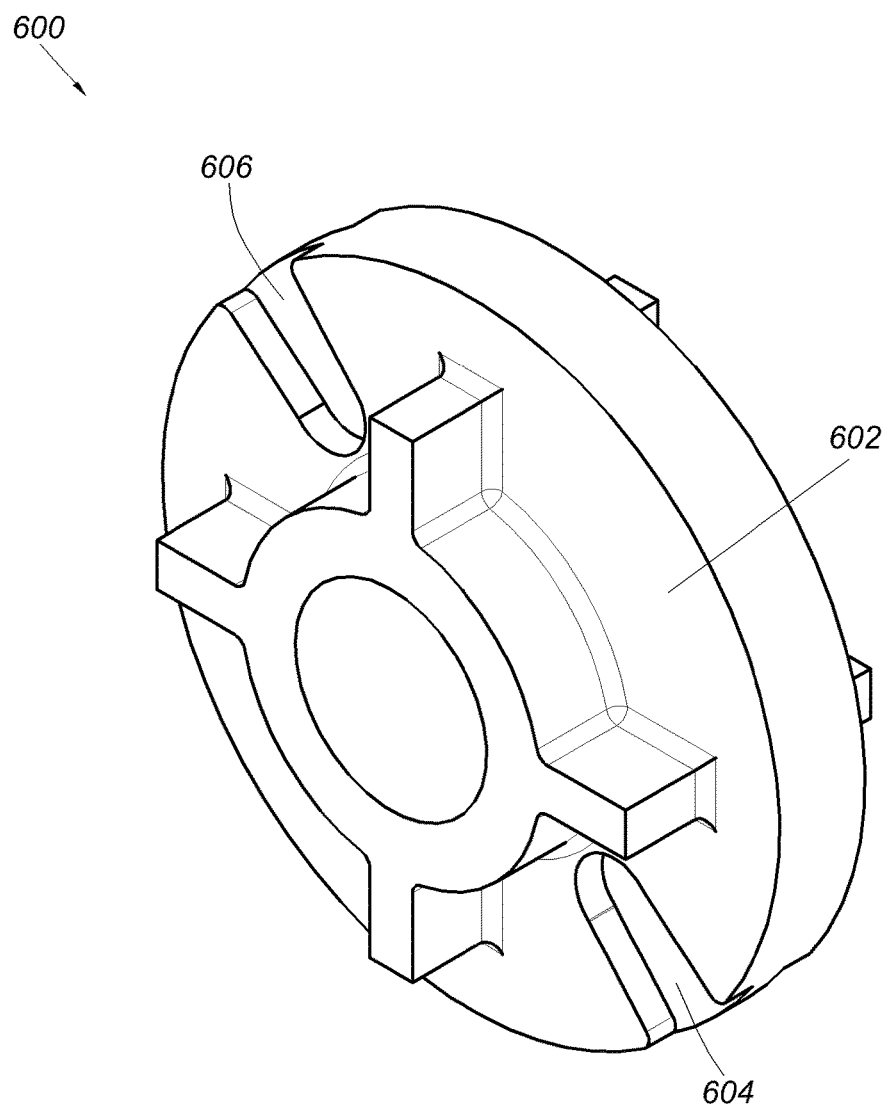
FIG. 29 is a diagram showing a base of a damping device according to a seventh embodiment of the present invention.

FIG. 29 is a diagram showing a base 600 of a damping device according to a seventh embodiment of the present invention. The base 600 has a surface 602, and at least one recessed part recessed from the surface 602. In the present embodiment, a first recessed part 604 and a second recessed part 606 are recessed from the surface 602 for example.

Figure 30:
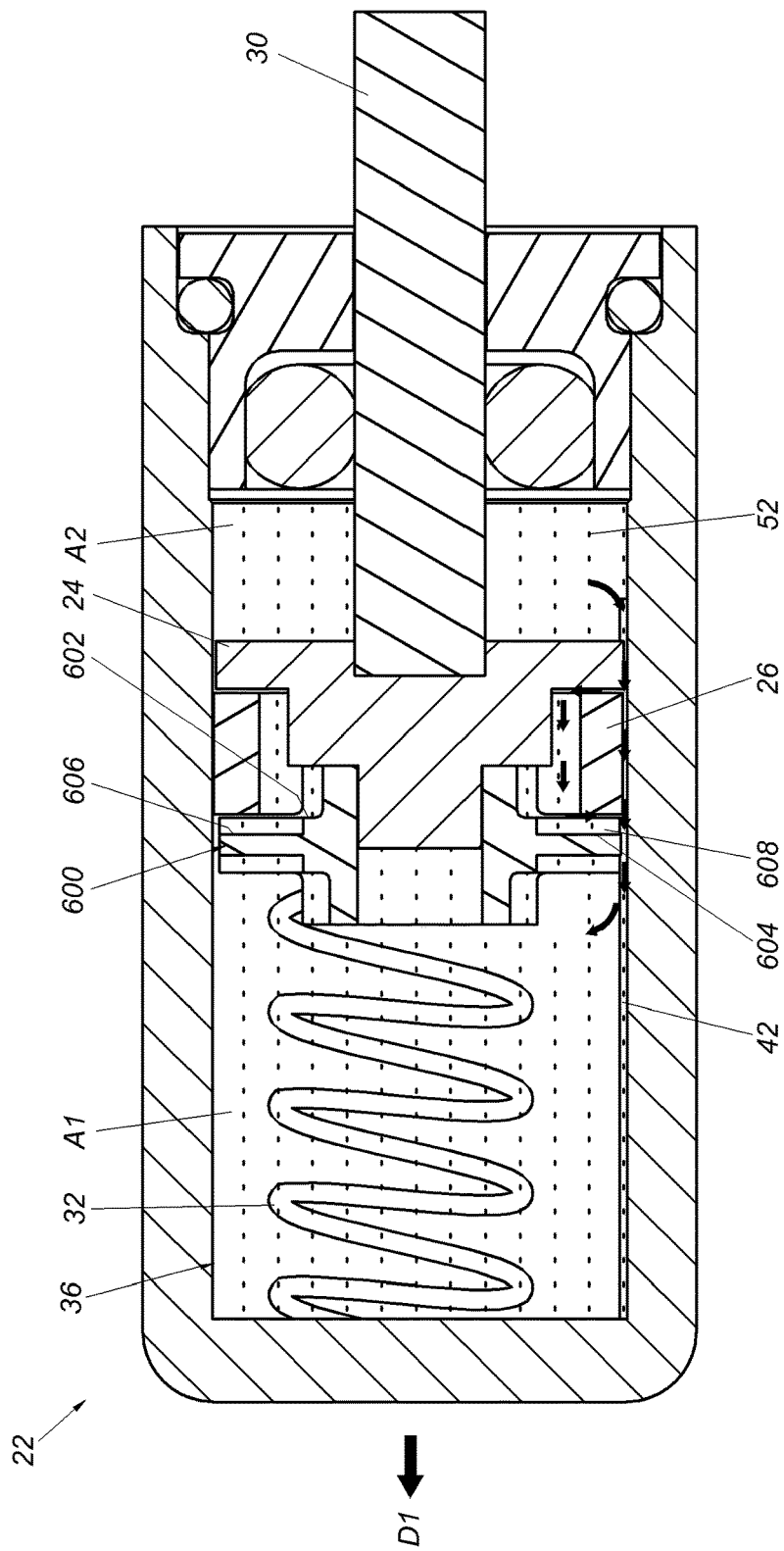
FIG. 30 is a diagram showing the housing of the damping device being moved relative to the piston in response to the elastic force of the elastic member according to the seventh embodiment of the present invention.

As shown in FIG. 30, in the damping device 20g of the seventh embodiment of the present invention, the surface 602 of the base 600 is configured to face the ring member 26. Wherein, the first recessed part 604 and the second recessed part 606 are configured to form a passage 608 between the ring member 26 and the base 600. When the housing 22 is moved relative to the piston 24 (or the piston rod 30) along the first direction D1 in response to the elastic force of the elastic member 32, the damping medium 52 flows back from the second region A2 to the first region A1 of the chamber 36 through the groove 42. In such backflow process, at least one portion of the damping medium 52 can pass through the passage 608 to enter the groove 42 and further flow to the first region A1. Therefore, with one more path provided to allow the damping medium 52 to pass through, the backflow speed of the damping medium 52 can be increased accordingly.

In the aforementioned embodiments, the passages are formed by a protruded or recessed structure of the base. However, in practice, the surface of the base facing the ring member can be a plane and the ring member 26 has a protruded or recessed structure. As such, the passage can also be formed between the surface (the plane) and the ring member 26 in order to allow the damping medium 52 to flow through.

Figure 31:
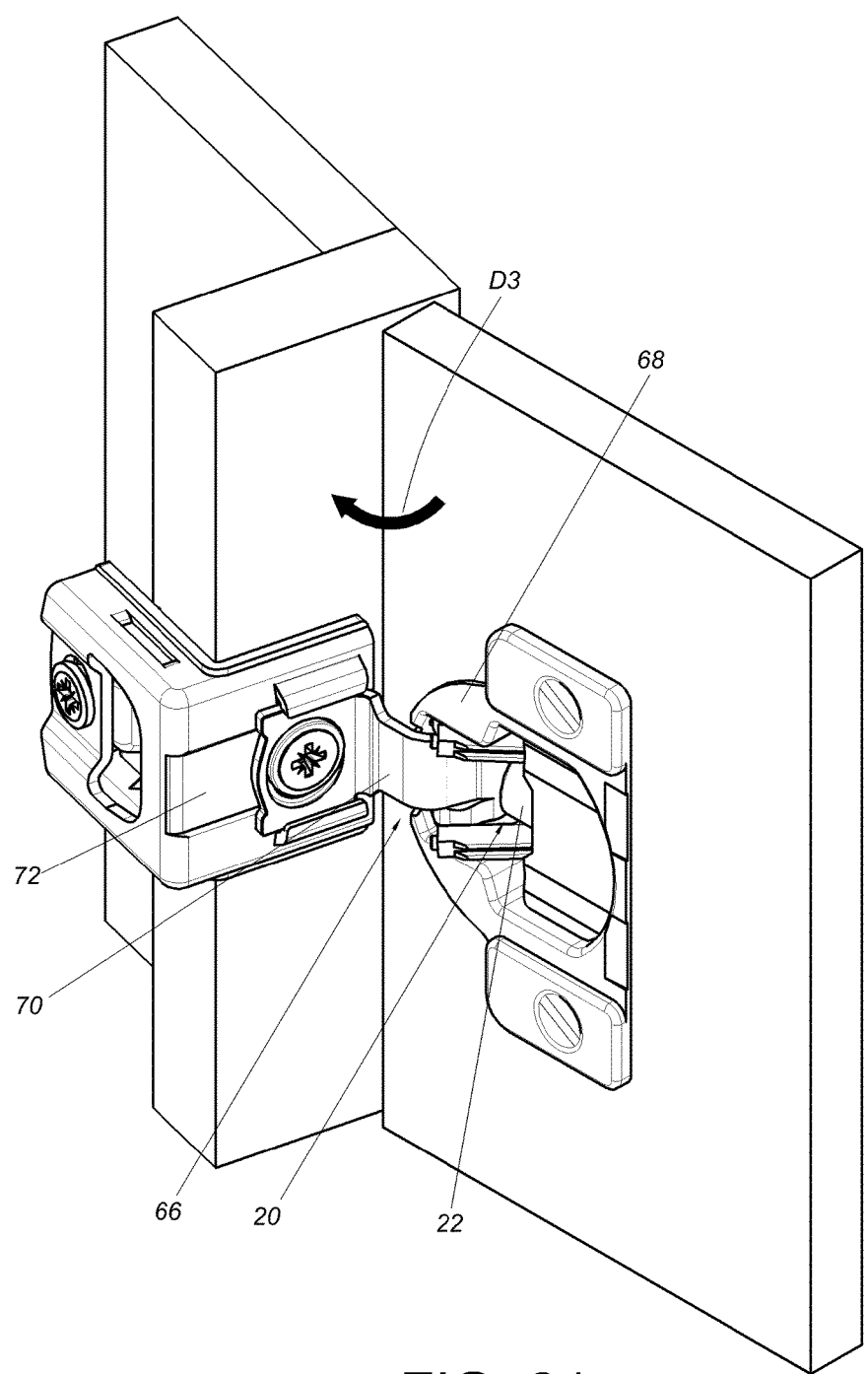
FIG. 31 is a diagram showing the damping device of the present invention applied to a furniture hinge.

As shown in FIG. 31, the damping device 20 is applicable to a furniture hinge 66. The damping device 20 can be one of the damping devices 20a to 20f according to the first embodiment to the seventh embodiment. The furniture hinge 66 comprises a first component 68 and a second component 70 pivoted to the first component 68. Preferably, the furniture hinge 66 further comprises an auxiliary elastic member (not shown in figures) configured to provide a force when the first component 68 is moved to switch from an open state to a close state relative to the second component 70. (the function of the auxiliary elastic member is well known to those skilled in the art. Therefore, no further illustration is provided.) The first component 68 can be mounted to a first furniture part (such as a door). On the other hand, the second component 70 can be mounted to a second furniture part (such as a cabinet) through a third component 72.

The damping device 20 is mounted to one of the first component 68 and the second component 70. Preferably, the first component 68 is a hinge cup, the second component 70 is a hinge arm, and the damping device 20 is mounted in the hinge cup. Wherein, when the first component 68 is moved along a direction D3 to switch from an open state to a close state relative to the second component 70 (such as at an end of traveling), the piston rod 30 of the damping device 20 abuts against the first component 68, and the housing 22 abuts against the second component 70. As such, the housing 22 and the piston 24 can be moved relative to each other for providing damping effect to mitigate movement of closing the first component 68 relative to the second component 70. The damping effect provided by the damping device 20 is explained in the above embodiments. For simplification, no further illustration is provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A damping device, comprising:
a housing having an inner wall defining a chamber, and an opening communicating with the chamber, the chamber being filled with a damping medium;
a cover assembly arranged adjacent to the opening of the housing;
a piston rod penetrating through the cover assembly;
a piston connected to the piston rod and movable relative to the housing, the piston comprising an extension part and an expansion part located between the piston rod and the extension part, wherein a width of the expansion part is greater than a width of the piston rod; and
an elastic member arranged in the chamber of the housing and configured to provide an elastic force to the piston;
wherein the cover assembly comprises a cover body, a sleeve member and a seal ring, the cover body provides a space for accommodating the sleeve member, the piston rod penetrates through the sleeve member, and the seal ring is sleeved on the cover body.

2. The damping device of claim 1, wherein the inner wall of the housing has a groove configured to allow at least one portion of the damping medium to pass through.

3. The damping device of claim 1, wherein a gap is formed between the expansion part and the inner wall of the housing and configured to allow the at least one portion of the damping medium to pass through.

4. The damping device of claim 1, further comprising a base mounted to the piston and adjacent to the extension part, the base being arranged in the chamber of the housing and abutting against the elastic member.

5. The damping device of claim 4, wherein the piston further comprises a mounting part protruded from the extension part, and the base is mounted to the mounting part.

6. The damping device of claim 4, wherein the base has at least one hole configured to allow at least one portion of the damping medium to pass through.

7. The damping device of claim 4, further comprising a ring member movably mounted between the expansion part of the piston and the base.

8. The damping device of claim 1, wherein the piston rod, the extension part and the expansion part are integrally formed.

9. The damping device of claim 1, wherein a width of the extension part is greater than the width of the piston rod and smaller than the width of the expansion part.

10. The damping device of claim 1, wherein the piston rod and the piston is made of a metal material.

11. A damping device, comprising:
a housing having a chamber, an inner wall of the chamber having a groove, the chamber being filled with a damping medium;
a piston arranged in the chamber of the housing;
a base mounted to the piston; and
a ring member arranged between the piston and the base;
wherein when the housing is moved relative to the piston, the damping medium can flow within the chamber through the groove for providing damping effect;
wherein the damping device further comprises a piston rod connected to the piston, and an elastic member configured to provide an elastic force between the housing and the piston;
wherein the housing further has an opening communicated with the chamber, the damping device further comprises a cover assembly arranged adjacent to the opening of the housing, and the piston rod penetrates through the cover assembly;
wherein the cover assembly comprises a cover body, a sleeve member and a seal ring, the cover body provides a space for accommodating the sleeve member, and the seal ring is sleeved on the cover body.

12. The damping device of claim 11, wherein the ring member is made of a flexible material.

13. The damping device of claim 11, wherein the damping medium comprises a fluid.

14. The damping device of claim 11, wherein the groove is arranged along a direction identical to a relative moving direction between the housing and the piston.

15. The damping device of claim 11, wherein the elastic member is arranged in the chamber of the housing.

16. The damping device of claim 11, wherein the base abuts against the elastic member.

17. The damping device of claim 11, wherein the piston is made of a metal material.

18. The damping device of claim 11, wherein the base has a recessed part configured to allow the damping medium to pass through.

19. A damping device, comprising:
a housing having a chamber filled with a damping medium;
a piston arranged in the chamber of the housing;
a base arranged in the chamber of the housing; and
a ring member arranged between the piston and the base;
wherein a passage is formed between the ring member and the base for allowing the damping medium to flow through;
wherein the damping device further comprises a piston rod connected to the piston, and an elastic member configured to provide an elastic force between the housing and the piston;
wherein the housing further has an opening communicated with the chamber, the damping device further comprises a cover assembly arranged adjacent to the opening of the housing, the piston rod penetrates through the cover assembly, the cover assembly comprises a cover body, a sleeve member and a seal ring, the cover body provides a space for accommodating the sleeve member, the seal ring is sleeved on the cover body.

20. The damping device of claim 19, wherein the base has a surface facing the ring member, and at least one recessed part recessed from the surface, in order to allow the passage to be formed between the ring member and the at least one recessed part of the base.

21. The damping device of claim 20, wherein the at least one recessed part has an inclined surface inclined relative to the surface.

22. The damping device of claim 21, wherein the inclined surface is extended to a periphery of the base.

23. The damping device of claim 19, wherein the base has a surface facing the ring member, and at least one rib protruded from the surface, in order to allow the passage to be formed between the ring member and the surface of the base.

24. The damping device of claim 19, wherein the base comprises a plurality of protrusions configured to abut against the ring member, the passage is formed between the plurality of protrusions.

25. The damping device of claim 19, wherein an inner wall of the chamber has a groove, the groove is configured to allow the damping medium to flow within the chamber when the housing is moved relative to the piston.

26. The damping device of claim 25, wherein the groove is as arranged along a direction identical to a relative moving direction between the housing and the piston.

* * * * *